US007673242B1

(12) United States Patent
Huntington et al.

(10) Patent No.: US 7,673,242 B1
(45) Date of Patent: Mar. 2, 2010

(54) SLIDING WINDOW PACKET MANAGEMENT SYSTEMS

(75) Inventors: Stephen Glen Huntington, Roy, UT (US); John Darren Major, Pleasant Grove, UT (US); Stanley P. Covington, Orem, UT (US); Bevan S. Rowley, Lehi, UT (US)

(73) Assignee: McAfee, Inc., Santa Clara, CA (US)

( * ) Notice: Subject to any disclaimer, the term of this patent is extended or adjusted under 35 U.S.C. 154(b) by 218 days.

(21) Appl. No.: 11/387,016

(22) Filed: Mar. 21, 2006

Related U.S. Application Data

(63) Continuation of application No. 10/199,420, filed on Jul. 17, 2002, now Pat. No. 7,162,698.

(60) Provisional application No. 60/306,107, filed on Jul. 17, 2001, provisional application No. 60/306,056, filed on Jul. 17, 2001, provisional application No. 60/306,106, filed on Jul. 17, 2001, provisional application No. 60/306,792, filed on Jul. 20, 2001, provisional application No. 60/311,142, filed on Aug. 9, 2001.

(51) Int. Cl.
*G06F 15/177* (2006.01)

(52) U.S. Cl. .................. 715/736; 715/734; 715/735; 715/737; 715/739; 715/738

(58) Field of Classification Search .............. 715/736, 715/734, 735, 739, 787, 783
See application file for complete search history.

(56) References Cited

U.S. PATENT DOCUMENTS

| | | | |
|---|---|---|---|
| 4,792,753 A | 12/1988 | Iwai | |
| 5,166,928 A * | 11/1992 | Nishioka et al. | 370/421 |
| 5,442,639 A | 8/1995 | Crowder et al. | |
| 5,586,264 A * | 12/1996 | Belknap et al. | 725/115 |
| 5,760,767 A * | 6/1998 | Shore et al. | 715/723 |
| 5,796,942 A | 8/1998 | Esbensen | |
| 5,933,602 A * | 8/1999 | Grover | 709/224 |
| 6,219,050 B1 * | 4/2001 | Schaffer | 715/853 |
| 6,236,396 B1 * | 5/2001 | Jenson et al. | 715/764 |

(Continued)

FOREIGN PATENT DOCUMENTS

WO    01/01726 A2    1/2001

OTHER PUBLICATIONS

Office Action Summary from U.S. Appl. No. 10/199,168 mailed on Aug. 17, 2005.

(Continued)

*Primary Examiner*—Simon Ke
(74) *Attorney, Agent, or Firm*—Zilka-Kotab, PC

(57) ABSTRACT

Included in the invention are systems and methods of full time recording network traffic to a hierarchical data storage. Also included in the invention are systems and methods of retrieval of recorded network traffic from a hierarchically organized network data repository. Additionally included in the invention are systems and methods of efficiently filtering data in a hierarchically organized network data repository. Systems and methods of displaying recorded network data utilizing the retrieval systems are also included in the invention. Further included in the invention are systems and methods of providing sliding time window selection user interfaces. Detailed information on various example embodiments of the inventions are provided in the Detailed Description below, and the inventions are defined by the appended claims.

21 Claims, 25 Drawing Sheets

U.S. PATENT DOCUMENTS

| | | | |
|---|---|---|---|
| 6,253,337 B1 | 6/2001 | Maloney et al. | |
| 6,266,700 B1* | 7/2001 | Baker et al. | 709/230 |
| 6,278,694 B1* | 8/2001 | Wolf et al. | 370/253 |
| 6,453,345 B2* | 9/2002 | Trcka et al. | 709/224 |
| 6,486,896 B1* | 11/2002 | Ubillos | 715/784 |
| 6,516,337 B1 | 2/2003 | Tripp et al. | 709/202 |
| 6,526,440 B1 | 2/2003 | Bharat | 709/219 |
| 6,529,954 B1* | 3/2003 | Cookmeyer et al. | 709/224 |
| 6,593,942 B1* | 7/2003 | Bushmitch et al. | 715/721 |
| 6,708,292 B1* | 3/2004 | Mangasarian | 714/39 |
| 6,792,546 B1* | 9/2004 | Shanklin et al. | 726/23 |
| 6,826,639 B2* | 11/2004 | Pasumansky et al. | 710/105 |
| 7,047,297 B2* | 5/2006 | Huntington et al. | 709/224 |
| 7,149,189 B2 | 12/2006 | Huntington et al. | 370/235 |
| 7,162,698 B2 | 1/2007 | Huntington et al. | 715/736 |
| 7,277,957 B2 | 10/2007 | Rowley et al. | 709/231 |
| 7,296,080 B2 | 11/2007 | Rowley et al. | 709/231 |
| 2001/0014211 A1* | 8/2001 | Morinaga | 386/111 |
| 2001/0039579 A1* | 11/2001 | Trcka et al. | 709/224 |
| 2002/0051448 A1 | 5/2002 | Kalkunte et al. | 370/389 |
| 2002/0173857 A1* | 11/2002 | Pabari et al. | 700/1 |
| 2002/0174362 A1* | 11/2002 | Ullmann et al. | 713/201 |
| 2003/0028662 A1* | 2/2003 | Rowley et al. | 709/231 |
| 2003/0131098 A1* | 7/2003 | Huntington et al. | 709/224 |
| 2003/0135525 A1* | 7/2003 | Huntington et al. | 707/501.1 |
| 2004/0010718 A1 | 1/2004 | Porras et al. | |
| 2004/0122811 A1 | 6/2004 | Page | 707/3 |

OTHER PUBLICATIONS

Notice of Allowance from U.S. Appl. No. 10/199,168 mailed on Dec. 21, 2005.

Notice of Allowance from U.S. Appl. No. 10/191,908 mailed on Aug. 30, 2007.

Office Action Summary from U.S. Appl. No. 10/199,451 mailed on Jan. 30, 2006.

Notice of Allowance from U.S. Appl. No. 10/199,451 mailed on Aug. 2, 2006.

Office Action Summary from U.S. Appl. No. 10/199,420 mailed on Mar. 8, 2006.

Office Action Summary from U.S. Appl. No. 10/199,420 mailed on Oct. 5, 2005.

Notice of Allowance from U.S. Appl. No. 10/199,420 mailed on Aug. 10, 2006.

Office Action Summary from U.S. Appl. No. 10/191,933 mailed on Oct. 11, 2005.

Final Office Action Summary from U.S. Appl. No. 10/191,933 mailed on Mar. 9, 2006.

Advisory Action Summary from U.S. Appl. No. 10/191,933 mailed on Jul. 27, 2006.

Notice of Allowance from U.S. Appl. No. 10/191,933 mailed on Dec. 5, 2006.

Office Action Summary from U.S. Appl. No. 10/199,168 which was mailed on Aug. 17, 2005.

Office Action Summary from U.S. Appl. No. 10/191,933 which was mailed on Oct. 11, 2005.

Office Action Summary from U.S. Appl. No. 10/199,451 which was mailed on Jan. 30, 2006.

Office Action Summary from U.S. Appl. No. 10/191,933 which was mailed on Mar. 9, 2006.

* cited by examiner

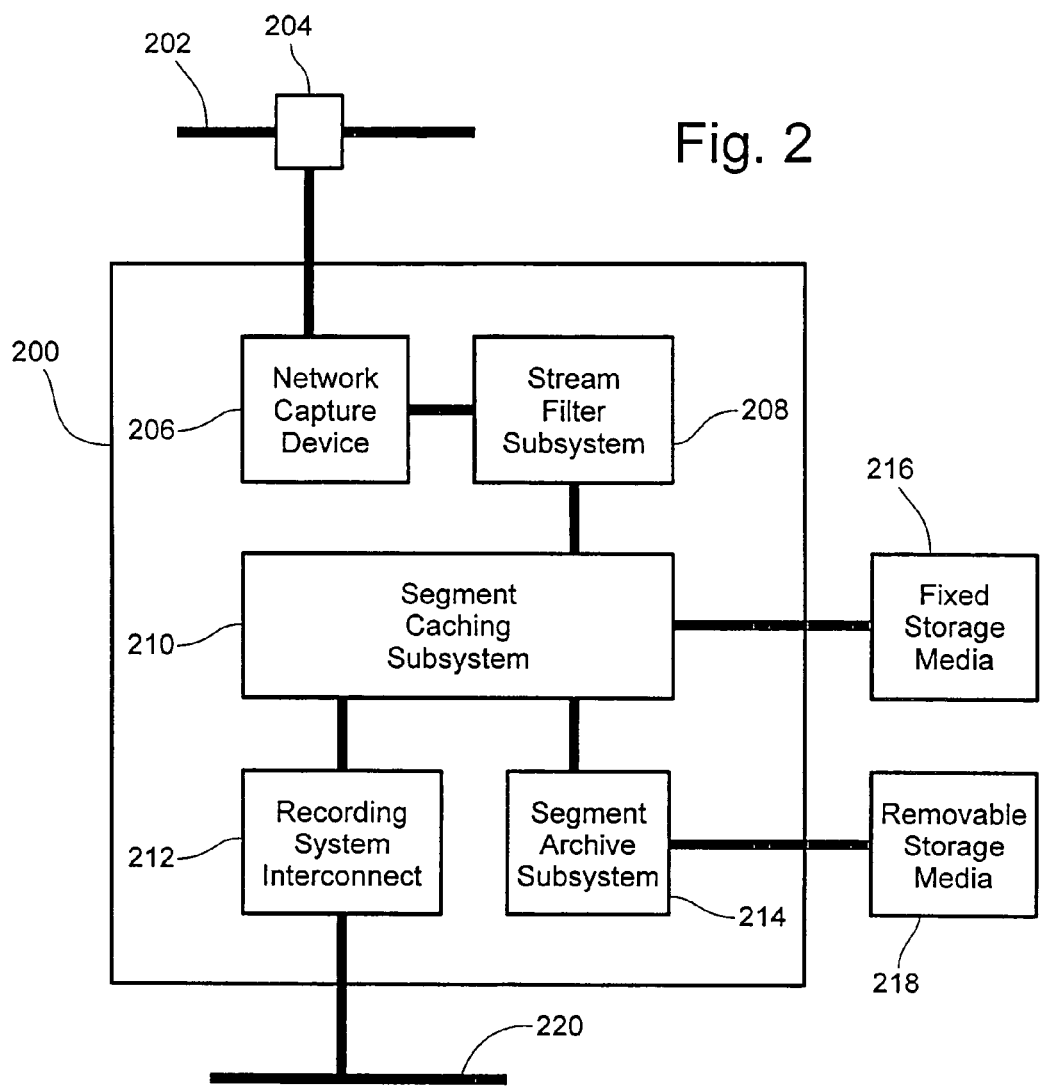
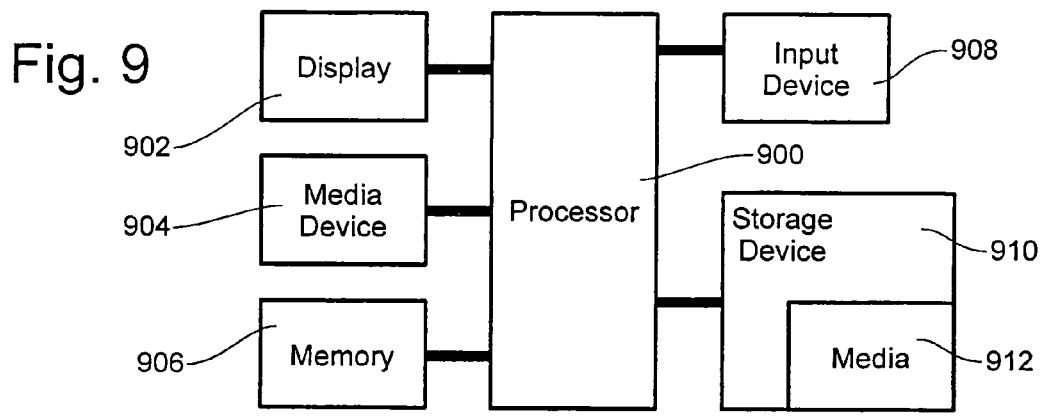

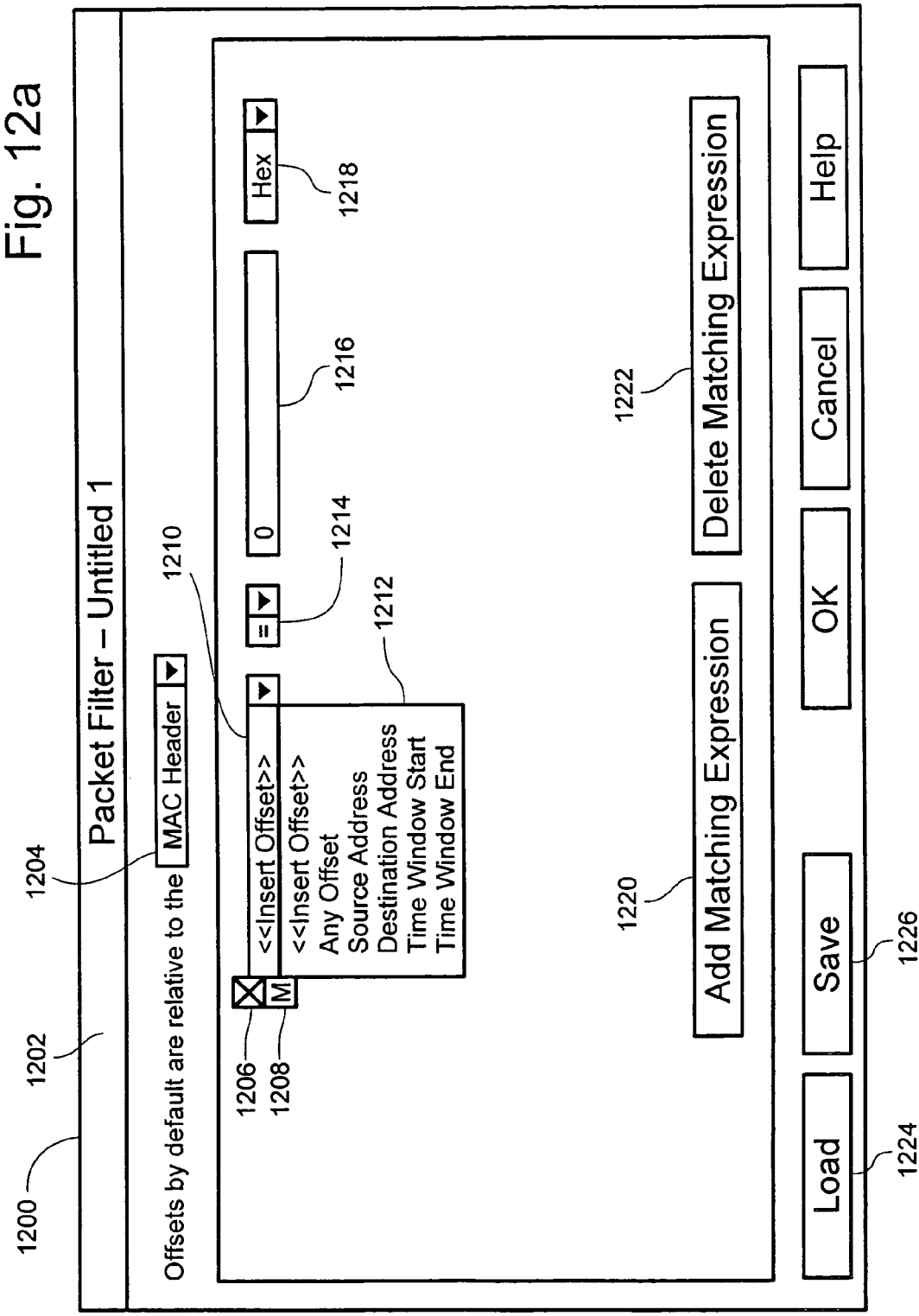

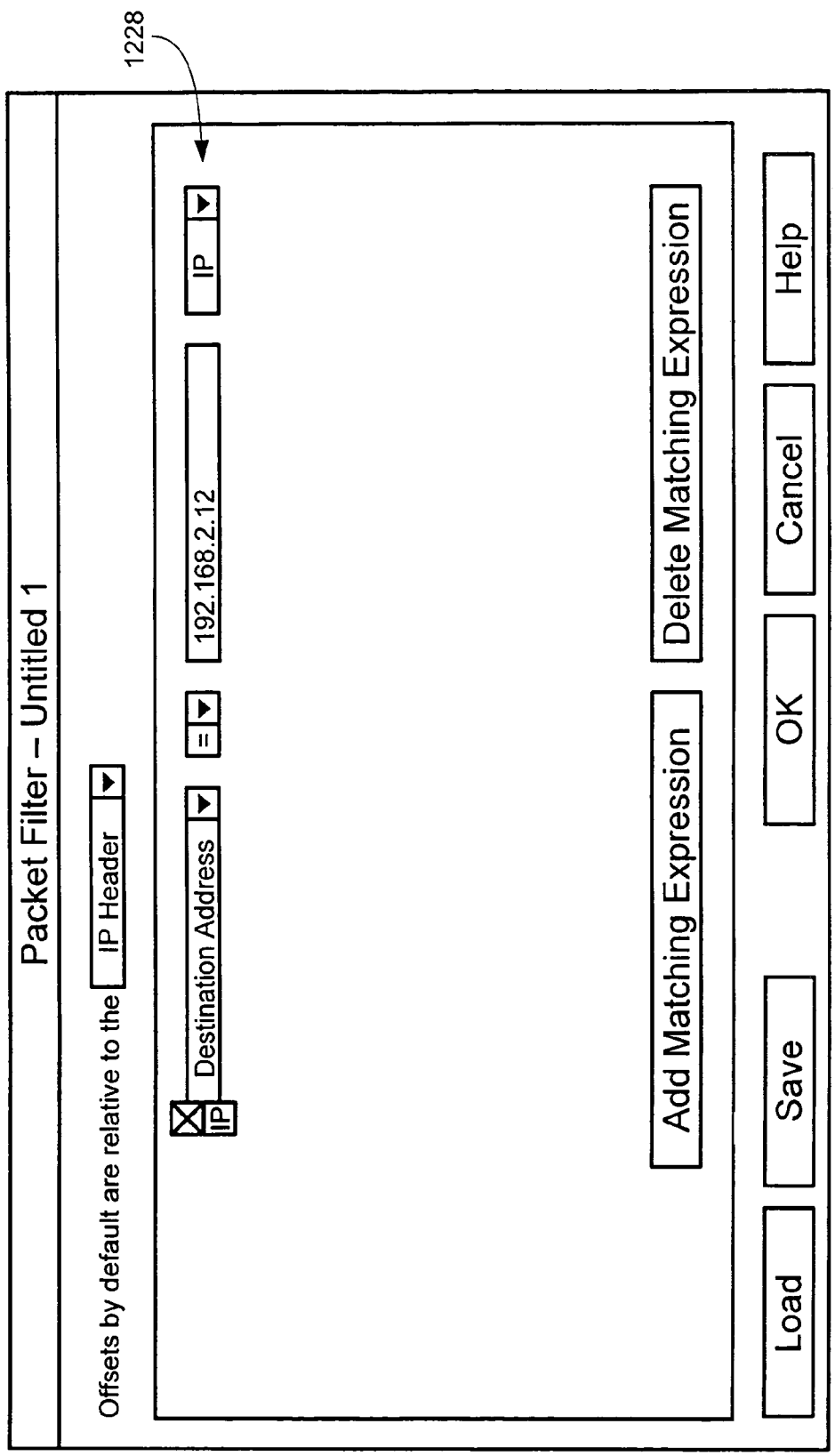

Fig. 15
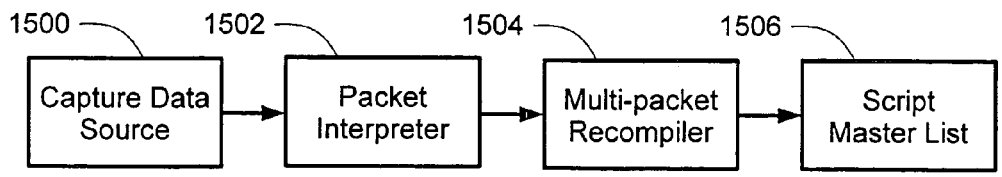
Fig. 21
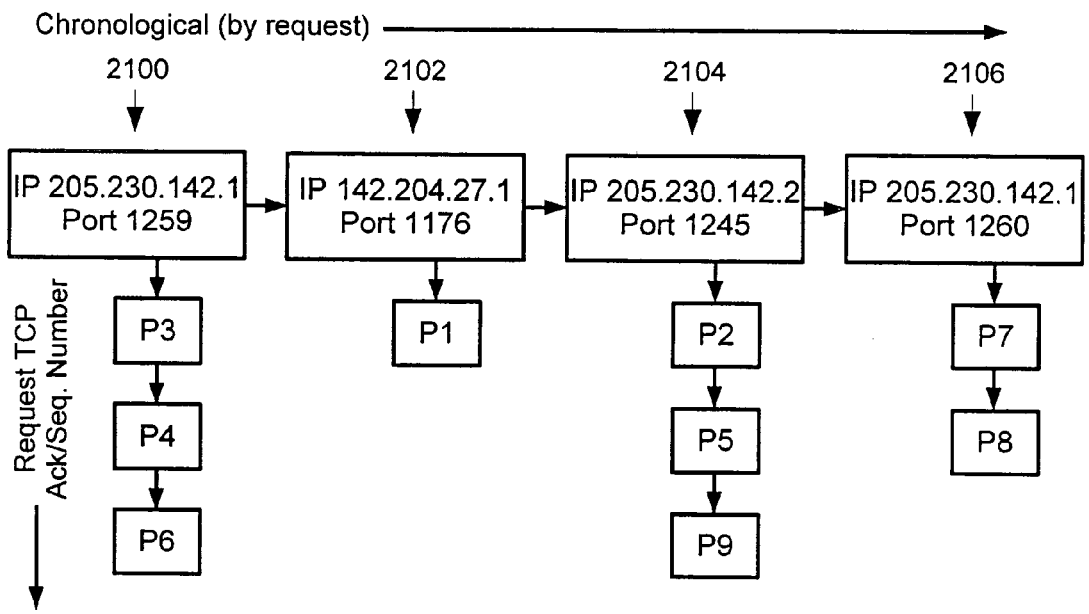
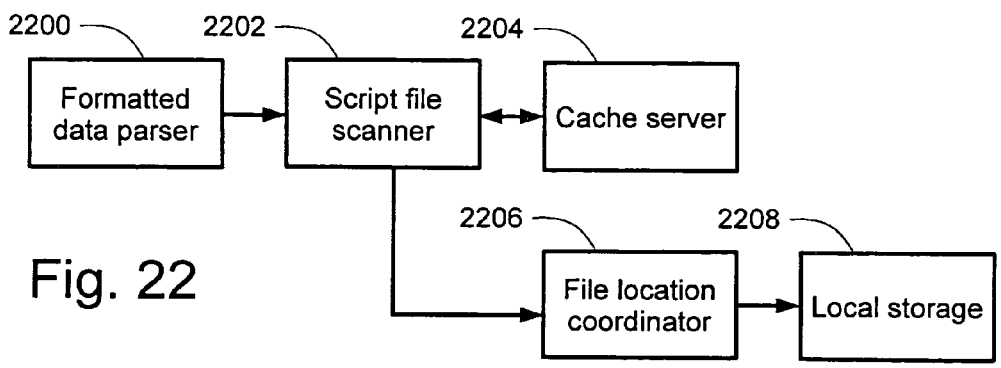
Fig. 22

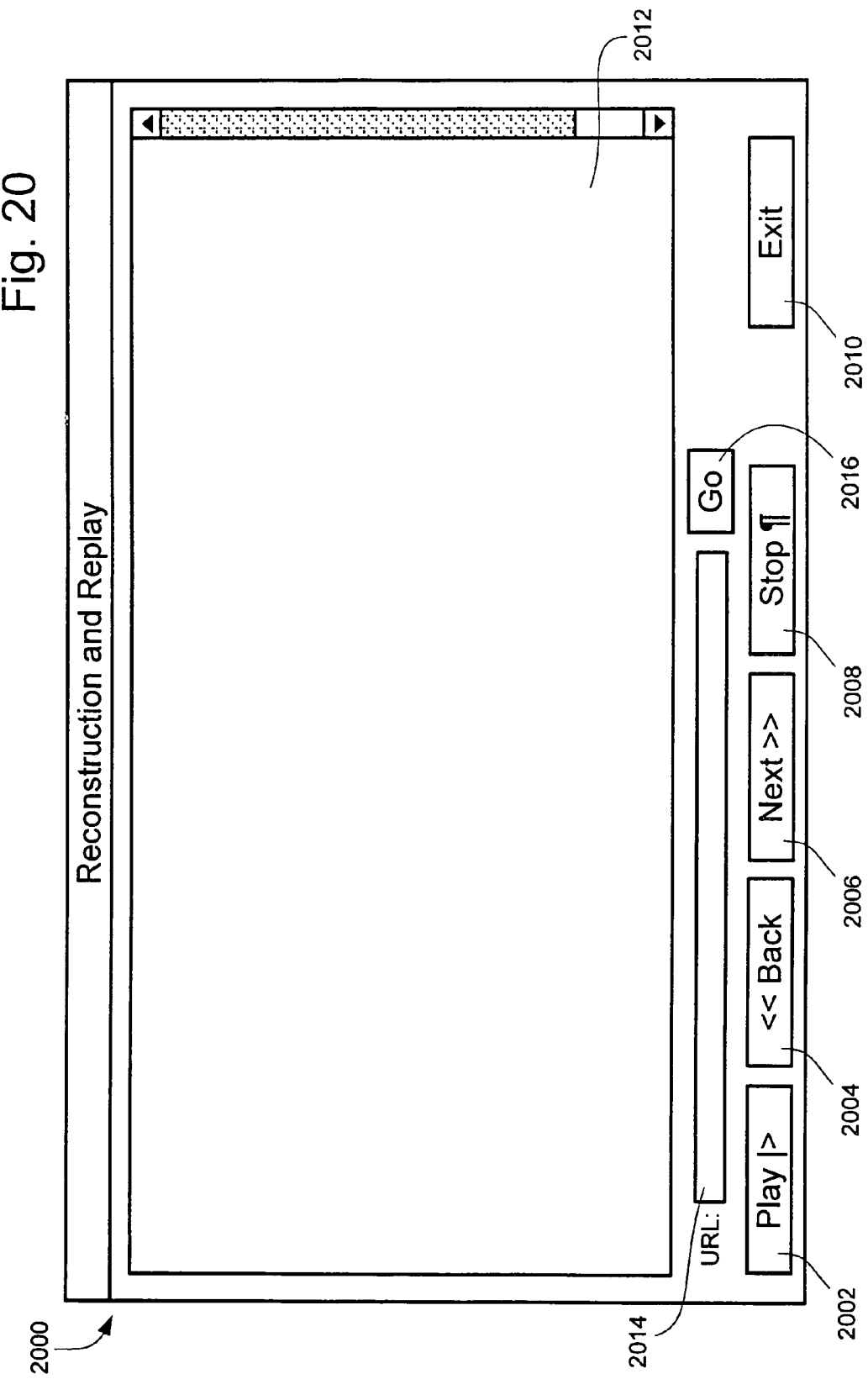

SLIDING WINDOW PACKET MANAGEMENT SYSTEMS

CROSS-REFERENCE TO RELATED APPLICATIONS

This is a Continuation application of prior application Ser. No. 10/199,420 filed Jul. 17, 2002, now U.S. Pat. No. 7,162,698 the disclosure of which is incorporate herein by reference.

This application claims the benefit of U.S. Provisional Application No. 60/306,107 filed Jul. 17, 2001, the benefit of U.S. Provisional Application No. 60/306,056 filed Jul. 17, 2001, the benefit of U.S. Provisional Application No. 60/306,106 filed Jul. 17, 2001, the benefit of U.S. Provisional Application No. 60/306,792 filed Jul. 20, 2001, and the benefit of U.S. Provisional Application No. 60/311,142 filed Aug. 9, 2001.

BACKGROUND OF THE INVENTIONS

Known in the art are devices, such as network protocol analyzers, which can capture a small portion of the traffic on a single path, cable, wire or route within a network, called a network segment. The major function of these devices is to analyze network behavior and more specifically facilitate diagnostic analysis. These devices generally operate by capturing a quantity of network traffic to memory or local storage, after which an operator may analyze the data in a variety of ways. Traditional network protocol analyzers have been developed around storage limitations. These devices are not suitable for capturing large quantities of network traffic, such as capturing all network traffic over the course of days or weeks at the main trunk of a WAN to Internet channel. Furthermore these devices do not provide redundancy, in that a failure of the device will cause a loss of traffic sampling. The sampled data is generally not made available externally to auxiliary devices, as that is not required for most diagnostic activities.

Prior to the invention it has not been possible to capture the network traffic over a segment over long periods of weeks or months. With the availability of capture data over long periods, many useful functions become possible that are not possible with limited protocol analyzers, three functions being provided here. First, it is more reasonable to find a malfunctioning network device if that device has an intermittent flaw that is rarely exhibited. Second it becomes feasible to track over a long period intrusions or an intrusive attempts from outside sources, the attempts intending to compromise security of network devices. This function may be especially desirable for network administrators, who are often not aware of these attempts until days or weeks after the occurrence. Third, it becomes possible to amass a quantity of data providing evidence of activity, for example, by criminal or terrorist groups and individuals that can be used for tracking or evidence in judicial proceedings.

BRIEF SUMMARY OF THE INVENTIONS

Included in the invention are systems and methods of full time recording network traffic to a hierarchical data storage. Also included in the invention are systems and methods of retrieval of recorded network traffic from a hierarchically organized network data repository. Additionally included in the invention are systems and methods of efficiently filtering data in a hierarchically organized network data repository. Systems and methods of displaying recorded network data utilizing the retrieval systems are also included in the invention. Further included in the invention are systems and methods of providing sliding time window selection user interfaces. Detailed information on various example embodiments of the inventions are provided in the Detailed Description below, and the inventions are defined by the appended claims.

OBJECTS OF THE INVENTIONS

It is an object of the invention to provide a full time network recording system to record large numbers of packets communicated on a network segment with minimal user intervention, and to provide facilities for retrieval, analysis, diagnostics, transaction verification, or evidentiary use.

BRIEF DESCRIPTION OF THE DRAWINGS

FIG. 2 depicts the components of one example of a network recording machine.

FIG. 9 illustrates a computing system of the invention.

FIG. 15 shows one example of a web session reconstruction system.

FIG. 20 depicts an example web session presentation interface.

FIG. 21 illustrates an example packet sorted list composed of IP packets.

FIG. 22 depicts a cache server system.

Reference will now be made in detail to some embodiments of the inventions, example of which are illustrated in the accompanying drawings.

DETAILED DESCRIPTION

Figure 1A:
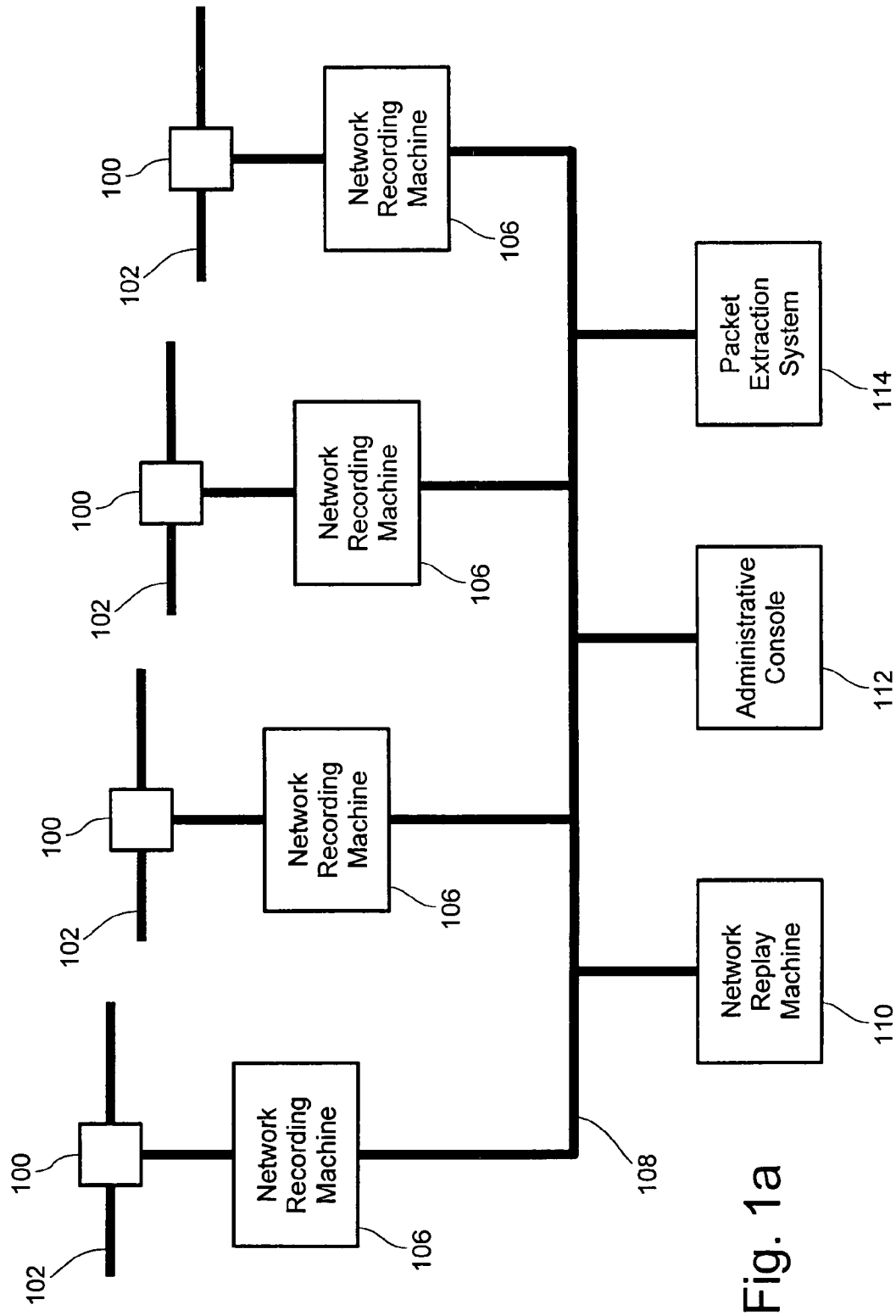
FIG. 1a depicts one example of a full time network recording system.

FIG. 1a illustrates principles of the invention showing one example of a full time network recording system, providing full time recording, retrieval and analysis of network packets. Traffic of network segments 102 are desired to be captured. Non-intrusive connections 100, such as network taps, are connected to segments 102 whereby network signals may be sampled without disturbance of the network being monitored. Network recording machines 106 sample the network traffic of network segments 102 through non-intrusive connections 100, recording network traffic to memory, or fixed or removable storage media. Examples of fixed storage devices are hard disks and flash ROM devices. Examples of removable storage media are CD-R and CD-RW disks, DVD-RAM and DVD-ROM disks, tapes, and hot-swappable SCSI hard disks. Network recording machines may be individual devices, or may be combinations of individual devices or processes serving the logical function of capturing network traffic from network segments. A connection 108 from network recording machines is provided to permit administration and communication of the sampled network traffic to other client devices or processes. In some systems of the invention connection 108 is provided as a network connection over an administrative network. In some circumstances provision of a separate administrative network will be desired. In other circumstances the administrative network connections may share network segments 102, in which it may be desirable for network recording machines 106 to filter the administrative network traffic from logical recording streams.

One or more administrative consoles 112 may be provided having functions to communicate with, configure, monitor, or control network recording machines 106. An administrative console 112 and one or more network recording machines 106 may exist on the same physical device, or may exist on separate physical devices using electronic communication services such as a network. One or more packet extraction systems 114 may be provided to retrieve, analyze, and present to clients recorded network data. A packet extraction system 114 may also operate on the same physical devices as network recording machines 106, or may exist on separate physical devices. One or more network replay machines 110 may also be provided to store and provide access to network traffic data on accessible storage independently of network recording machines 106. Replay machines 110 may be used to relieve communication load from network recording machines 106 and may provide supplemental storage to limited storage provided with network recording machines 106. The system of FIG. 1, although specifically showing four network segments, may be scaled to sample network traffic from any number of network segments.

Figure 1B:
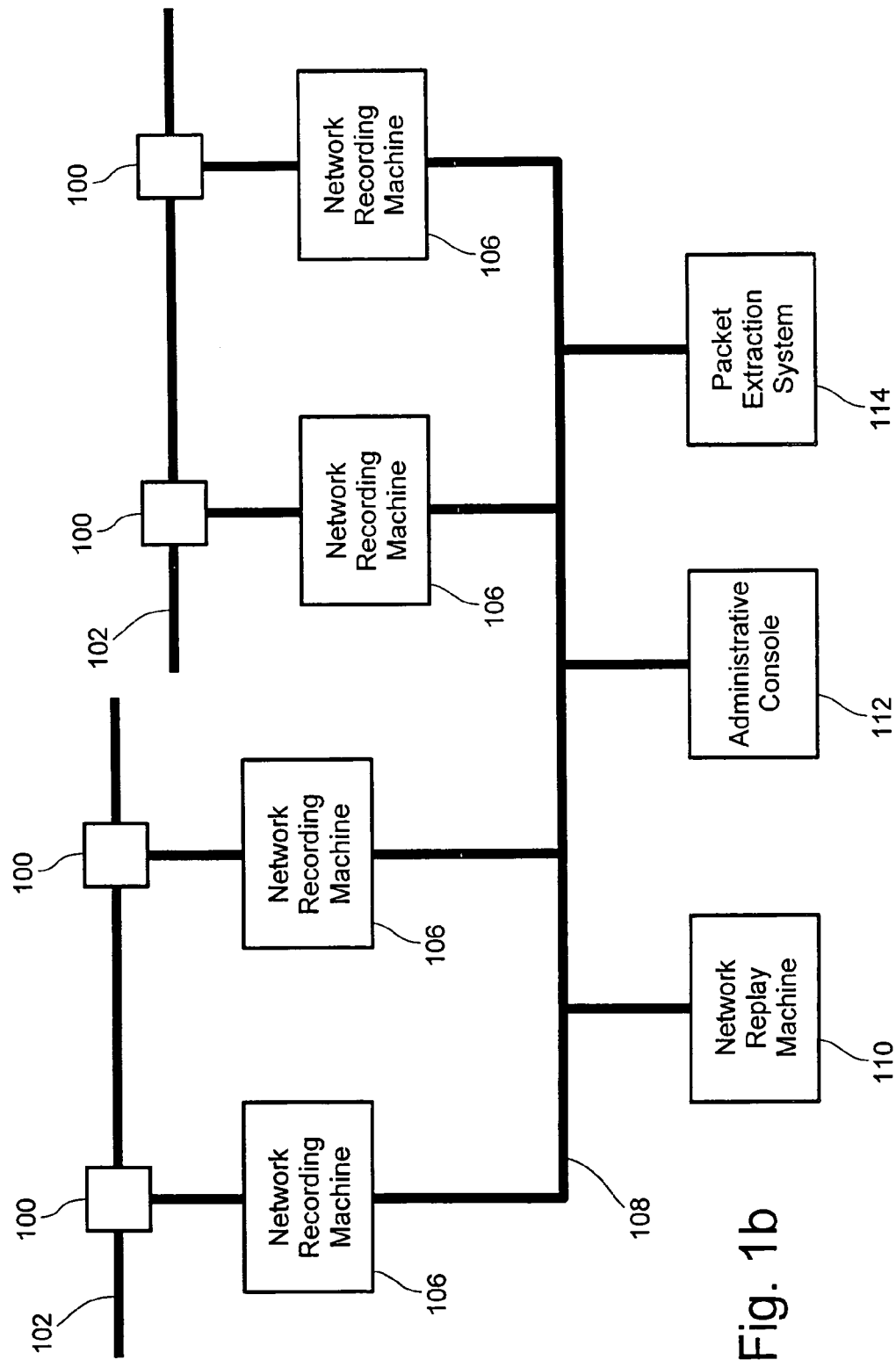
FIG. 1b depicts one example of a redundant or distributed network recording system.

FIG. 1b illustrates an alternate configuration of the system of FIG. 1a, in which dual network recording systems provide redundant operation for each sampled network segment.

Network Recording Machines

FIG. 2 illustrates the components of one example of a network recording machine 200. The machine 200 contains a network capture device 206, which for example might be a network adapter operating in promiscuous mode, capturing not just traffic destined for the network adapter but all traffic appearing on a connected network segment. The network capture device 206 samples network traffic on a network segment 202 by non-intrusive connection 204. Sampled traffic is delivered from the network capture device 206 to a stream filter subsystem 208, which filters the incoming traffic using filter criteria to remove traffic that is not desired to be recorded. In that example of a network recording machine, the stream filter subsystem channels the contents of a stream of network traffic through software filters, annotates each packet with a header containing hierarchical time-based descriptors, and packages data into structures suitable for permanent storage. The filtered sampled traffic is passed from the stream filter subsystem 208 to a segment caching subsystem 210 which stores network traffic in a memory cache. A segment caching subsystem is one type of network data caching system. A recording system interconnect 212 may be provided to communicate network packet data with other systems on an administrative network 220, if desired. A segment caching subsystem may also cache segments on storage, for the purpose of delivering network data to clients through the interconnect.

In improved systems of the invention a zero-memory copy technique is used by the network recording machine to improve performance. Rather than copying packet information between processes, a shared memory structure is used and references to packet information of the shared memory structure are passed between processes, avoiding the additional processing overhead of copying large quantities of data.

Systems of the invention convert raw streams of sampled network traffic to logical recording streams by filtering of network traffic. A logical recording stream, for the purposes of this writing, is a filtered sequence of network packets from a single network segment. Each logical recording stream is assigned a unique identifier at creation. Those systems further form logical stream segments which contain portions of a logical recording stream over a specific interval of time. Those logical stream segments contain time bounded sets of logical recording stream packets, annotated with starting and ending time stamps. Each logical stream segment is also assigned an identifier, unique to at least the set of logical stream segments of the logical recording stream. In one system of the invention, each logical stream segment is identified by a 32 bit integer.

A preferred network recording machine of the invention uses a 2.0 GHz Pentium III or Pentium IV processor with 2 gigabytes of provided RAM. A dual processor system is preferred, although not required. The RAM is preferably dual gated or dual ported to provide improved memory throughput. An operating system, such as Linux, is provided in the form of a flash IDE solid-state disk. An Intel Pro-1000 series 10/100/1000 network card is provided for a network capture device, in either optical or wire physical network versions, having a PCI bus speed of 133 MHz. As fixed storage, a series of ATA-133 IDE disks are provided which are interfaced to the processor through a 3-Ware Escalade 7850 IDE RAID card. For removable storage one or more Exabyte 430M SCSI tape drive are provided. It is envisioned that writable CDs may be used for removable storage in an automated CD jukebox, although it appears that such systems have not yet developed to maturity. A preferred network recording machine performs only capture operations, and not data mining operations, to maximize the capture bandwidth.

Hierarchical Data Organizations

Figure 4C:
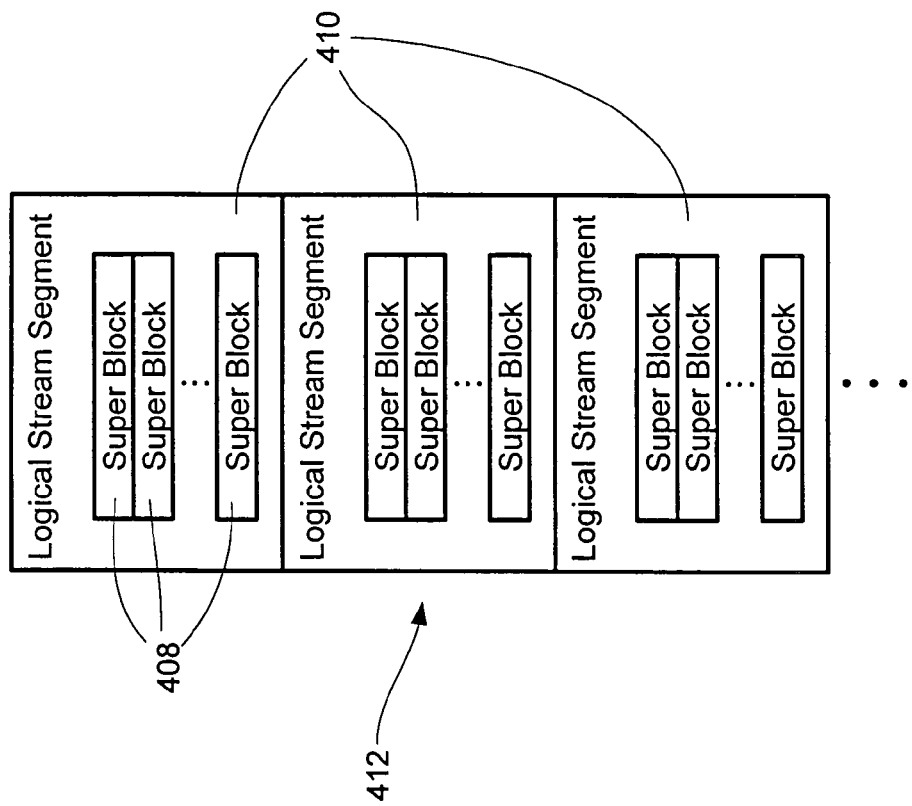
FIG. 4 depicts one type of hierarchical data organization.
Figure 4A:
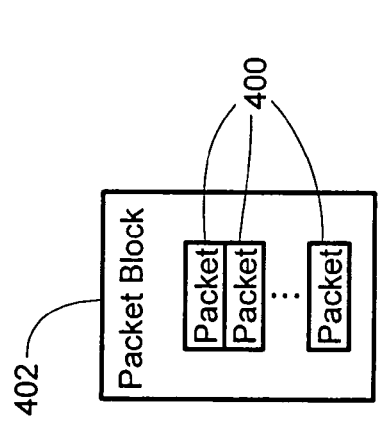
Figure 4B:
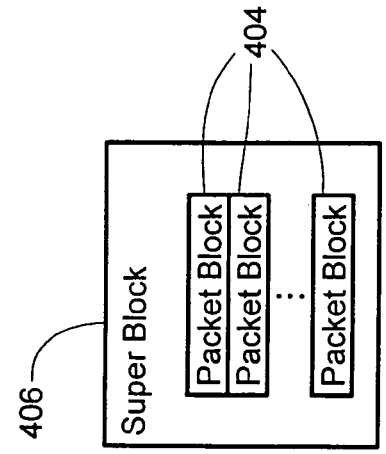

Systems of the invention utilize the hierarchical data organization of FIG. 4, by which data may be handled in blocks of sizes appropriate for various tasks. Using this organization, hierarchical time-based indexing is practicable, whereby the contents of a captured network data stream may be divided into finite logical storage units of periods of capture time. Hierarchical time-based indexing uses multiple levels of logical storage units, whereby captured network data may be subdivided into finer grained sub-units representing smaller periods of time, which eventually reach the level of a single packet of data. FIG. 4 shows one hierarchical data organization of the invention. In FIG. 4*a*, groups of individual packet structures 400 are stored in a packet block 402. Packet structures may contain additional information for management of packet data contained therein. Referring to FIG. 4*b*, groups of packet blocks 404 are stored within a super block structure. In some systems of the invention a super block is a 16 megabyte structure containing a sequence of 256 packet blocks of 64 kilobytes. Those super blocks are annotated with beginning and ending time stamps. Those super blocks may also contain tables of contents containing indexing information, such as time intervals for specific packet blocks, to facilitate searching for contained packet blocks having a match to a set of filter criteria. Referring to FIG. 4*c*, groups of super block structures 408 are stored in logical stream segments 410. A series of logical stream segments 410 forms a logical recording stream 412. Each data structure from the logical stream segments down to the packet structures stores sampled network traffic in finer graduations of time, facilitating ease of searching and data handling on a hierarchical basis. Those logical stream segments may also contain tables of contents to facilitate searching for contained super blocks or packets having a match to a set of filter criteria.

To identify a specific stream of network traffic a universal recording stream definition may be used in the stream filter subsystem as well as other systems. For example, the following C language structure delineates a universal stream definition through a universal stream record and may be used to describe a universal recording stream:

```
struct   universal_stream_record
{
         int     proprietary[13];
         int     machine_id;
         int     universal_stream_id;
         int     network_segment_type;
         char    network_segment_id[16];
         char    local_mac[16];
         struct
         {
                 int     operator_type
                 int     packet_offset
                 char    data_value[24];
         } filters[5];
};
```

The machine_id field is the unique identifier of the network recording machine. The universal_stream_id is a unique number for each universal recording stream, which number may be annotated to network packets captured from the stream. The network segment type identifies the type of network segment being captured from, for example ethernet or token ring. The network_segment_id may contain an identifier for the network segment being sampled. The local_mac field is the MAC address of the network capture device. Placeholders for five filters are provided, although any number may be practiced as may be desirable. Each filter is defined by an operator_type, a packet_offset, and a data_value. The operator_type indicates the type of expression which is to be applied to packet data at the offset given in packet_offset with respect to the value in data_value. Many operators such as equal, not equal, greater than, less than, etc, may be implemented. The proprietary field provides space for implementation specific information or alignment padding.

In one system of the invention, universal stream records are stored in a universal stream database on network recording machines. The database provides information about the logical recording stream definitions and configuration that are used by a group of network recording machines. As media is imported onto a network recording machine, the corresponding universal stream records are imported into the database. If necessary, the universal stream id fields are adjusted as the data is cached and accessed to insure uniqueness.

Systems of the invention handle packet data in a packet block structure. The following C language structure gives one representation of a packet block containing a variable number of network packets in a 64 kilobyte array:

```
struct   packet_block
{
         int     universal_stream_id;
         int     logical_segment_id;
         int     starting_time_stamp;
         int     ending_time_stamp;
         int     starting_packet_number;
         int     proprietary[16];
         int     block_number;
         int     packet_index;
         int     packet_count;
         int     space_remaining;
         int     packet_data[(65536/4) – 25];
} packet_buffer;
```

The universal_stream_id field contains the universal stream identifier of the stream from which the packet data was captured, as provided in the universal stream record. The logical_segment_id field contains the identifier of the logical stream segment containing the packet block. The starting time_stamp and ending_time_stamp fields contain the start and end times of the interval over which the packet data was captured. The starting_packet_number field contains the sequential packet number of the first packet of the packet block, relative to the beginning of the logical stream segment. The block number is a sequence number relative to the logical stream segment that contains the packet block. The packet_data field contains the packet data. The packet_index field may be used to contain the index to the next unused location in the packet data array, as the packet block is being filled. The packet_count field contains the number of packets stored in the packet block. The space_remaining field may contain the amount of remaining free space in the packet data array. The proprietary field provide space for implementation specific information or alignment padding.

Each packet contained in those packet blocks is enveloped in a data structure called a packet header, which stores additional information about each packet. The following C language structure represents a packet enclosed in a packet header:

```
struct   normal_packet_header
{
         int     packet_type;
         int     packet_number;
         int     second_stamp;
         int     micro_second_stamp;
         int     data_length;
         char    packet_data[ ];
}
```

In this example, a packet type field is provided to store indication of whether this header represents a normal packet, a gap or error, or other indication. For normal packet headers, the packet_type field will be set to a value that indicates a normal packet. The packet_number field contains the sequential number of the stored packet of the logical stream segment. The second_stamp and micro_second_stamp fields contain the time the packet was sampled. The data_length field contains the number of bytes in the packet. The packet_data array stores the packet contents. The packet header may contain other information, such as the source of the packet, the filter used for the packet, archive information, and other information as deemed desirable.

To record error conditions, the following error packet header may be substituted for the normal packet header:

```
struct  error_packet_header
{
        int   packet_type;
        int   packet_number;
        int   second_stamp;
   int  micro_second_stamp;
   int  error_type;
}
```

The fields are as in the normal packet header, except there is no packet data. The packet_type field is set to indicate an error. An error_type field is provided to denote the type of error indicated by the error packet header, for example dropped, corrupt, etc.

A gap packet structure may indicate gaps in the recorded stream, as exemplified by the following C language structure:

```
struct  example_gap_packet_header
{
        int   packet_type;
        int   packet_number;
        int   packet_count;
        int   first_second_stamp;
        int   first_micro_second_stamp;
        int   last_second_stamp;
        int   last_micro_second_stamp;
}
```

The packet_type field is set to indicate the record of a gap. The packet_number, first_second_stamp, and first_micro_second_stamp fields may contain the packet number and time of receipt of the first packet that was not received in the gap (but was received at another network recording machine.) The packet_count field stores the number of packets that were not sampled in the gap. Finally, the last_second_stamp and last_micro_second_stamp contain the time of the last packet that was not received in the gap.

A series of these packet structures including gap information is called a sparse recording stream. A logical stream segment with gap packets inserted during distributed stream capturing containing a partial record of the captured data is called a sparse logical stream segment.

A repository of hierarchically organized network traffic data is referred to as a hierarchical network traffic data repository, regardless of whether the repository is resident in memory, on storage, or in another location.

Stream Filter Subsystems

In one system of the invention, a full time network recording system is given that performs packet splitting. The data packets sampled from a network segment may consist of packets that are not interesting or important. That system provides for multiple logical recording streams to be defined for a particular network segment which may be cached and archived independently of each other. Some streams of network packets would then be configured to be permanently archived, and others can be aged in cache and eventually discarded.

One example of a stream filter subsystem is given, which manages the allocation, freeing and usage of the memory structures associated with logical recording streams and logical stream segments. That stream filter subsystem also allocates, frees and fills packet blocks. When a logical recording stream is activated the stream filter subsystem creates a new logical stream segment. It then annotates the logical stream segment with a beginning time stamp and allocates a packet buffer to receive captured packets.

The stream filter subsystem receives a stream of packets from a network capture device. Each packet is processed through a filter to determine which logical recording streams into which it should be inserted. When the packet is inserted into a logical recording stream that stream filter subsystem copies the packet content into a packet buffer of the logical recording stream. The packet is enveloped in a packet header, annotated with a time value and copied into a packet block.

When a packet buffer, such as a logical stream segment, becomes full that stream filter subsystem annotates an ending time stamp to the buffer and queues it to the segment caching subsystem, which will copy the segment to storage media. After the buffer is queued, the packet buffer may be freed and the memory reused, or the packet buffer state may be reset and the packet buffer structure recycled. That stream filter subsystem monitors timing and capacity thresholds assigned to the logical recording stream, and automatically allocates new logical stream segments and closes filled logical stream segments in accordance with provided configuration.

Segment Caching Subsystems

One example of a segment caching subsystem provides persistent storage for packet blocks, such as logical stream segments, filled by a stream filter subsystem. That segment caching subsystem uses the network recording cache format of FIG. 5. At initialization, that segment caching subsystem reads the section allocation map of each available fixed storage device, validates the contents of each section, and builds a free section list. When space becomes needed, that segment cache subsystem allocates fixed increments of storage space from the free list. If no free space is available, that segment cache subsystem may recycle super block sections which have been archived to removable storage media, or may recycle super block sections which have aged or have a low priority.

That segment caching subsystem initializes a universal stream database by reading and verifying the universal record tables on each fixed storage device and building the associated data structures in memory. That segment caching subsystem also initializes a master segment database by reading and verifying the segment record tables on each fixed storage device and building more associated data structures in memory. The master segment database provides information about the time ranges and stream definitions of the available logical stream segments. New records are added to the master segment database as new logical stream segments are created or if a foreign removable storage media is imported with new stream segments.

That segment cache subsystem initializes a master media database by reading and verifying the media record tables on each available fixed storage device and building more associated data structures. The master media database provides information about the time ranges and stream definitions of fixed and removable storage media. New records are added when new formatted media becomes available, as might occur when an available fixed storage device is formatted or when a foreign removable storage media is imported. This database may also provide location information used by a segment archive subsystem to control the robotics of autochangers for removable storage.

That segment cache subsystem on initialization also reads and verifies the segment super block maps on each available fixed storage device. A single segment super block map may contain multiple segment map tables, those tables containing timing information and storage location information of the data of each super block of a logical stream segment. A segment map table is allocated and assigned when a new logical stream segment is created or an imported segment is cached on the network recording machine. That segment cache subsystem maintains a list of free segment map tables. When needed, new segment map tables are allocated from the super block map allocation table. The arrangement of segment map table entries is identical to the arrangement of super blocks (i.e. segment map table entry 7 contains the timing and storage location for super block 7).

That segment caching subsystem receives notification from the stream filter subsystem upon creation of a logical stream segment. In that event, a segment map table is allocated and initialized, and a new super block allocated for the storage of new network data. The stream filter subsystem also notifies the segment cache subsystem when it closes a logical stream segment. In that event the segment cache subsystem updates all tables and records, and flushes all buffers.

As packet buffers are queued to be written, that segment cache subsystem writes the data from memory to the segment data area on the fixed storage devices. The segment cache subsystem then releases the packet buffer on success for re-use.

Network Recording Cache Format

Figure 5:
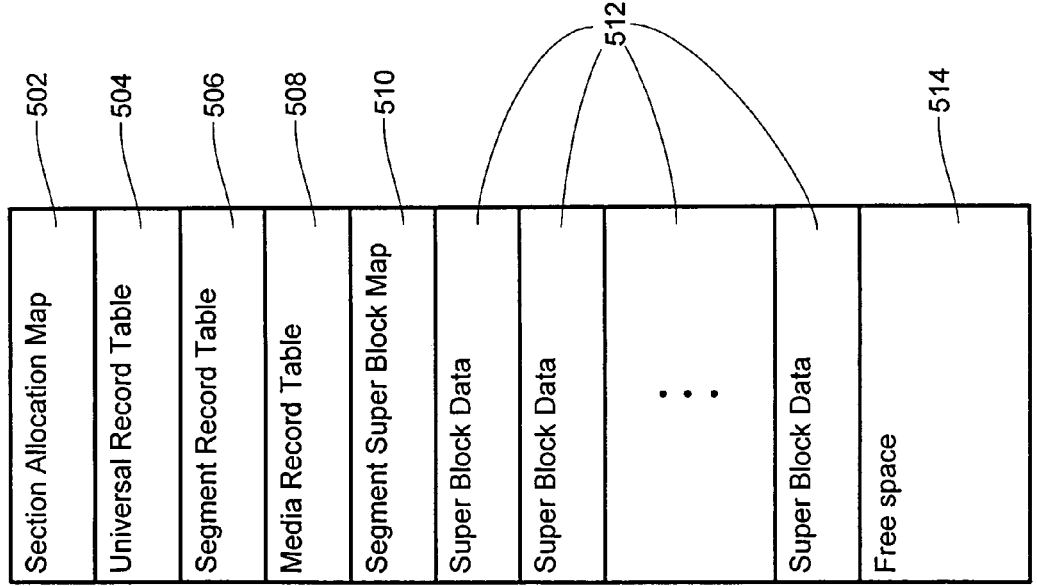
FIG. 5 depicts a network recording cache format.

Referring to FIG. 5, a network recording cache format useful for providing local cached network data storage on fixed storage media, as is used by some embodiments of segment caching subsystems. Storage on a fixed media device 500 is subdivided into sections, in one example 16 megabyte sections capable of containing a single 16 megabyte super block. Each section can be used for a variety of purposes. The first section, or other section with fixed location, contains the section allocation map 502, which is a table of records describing the use of the sections of the storage media. The section allocation map 502 provides management of the allocation and assignment of the sections of the media. The section allocation table length will vary between media devices depending on the total capacity of the device or partition. The following C language structure gives one representation of a section map record of the section allocation map:

```
struct section_map_record
{
    int record_type;
    int universal_stream_id;
    int logical_segment_id;
    int packet_block_number;
    int proprietary[12];
} section_allocation_map[ ];
```

The record_type identifies the section as being free or invalid, or containing the universal record table, segment record table, media record table, a segment super block map, or super block data. The universal_stream_id field contains the universal stream identifier of the logical recording stream for which data is stored in a section. The logical_segment_id field contains the identifier of the logical stream segment for which data is stored in a section. The proprietary field may contain other implementation specific information or alignment padding.

The universal record table 504 contains a list of all logical recording segments active on the network recording machine. This table is normally duplicated across all the network traffic caching storage devices of a network recording machine. The universal stream identifier may simply be an index into this table.

The segment record table 506 contains a list of all segments present to the network recording machine, and is also normally duplicated across all the network traffic caching storage devices of a network recording machine. The following C language structure defines one example of a segment table record of that table:

```
struct segment_table_record
{
    int universal_stream_id;
    int logical_segment_id;
    int starting_time_stamp;
    int ending_time_stamp;
    int super_block_count;
    int proprietary[11];
} segment_record_table[ ];
```

The universal_stream_id field contains the universal stream identifier of the logical recording stream from which the packet data of the segment was captured. The logical_segment_id field contains the identifier of the logical stream segment containing the packet blocks of the segment. The starting_time_stamp and ending_time_stamp fields contain the start and end times of the interval over which the packet data was captured. The super_block_count field contains the number of super blocks contained in the segment. The proprietary field may contain other implementation specific information or alignment padding.

The media record table 508 contains a list of all network traffic caching storage devices of a network recording machine, and is stored on each of those storage devices. The following C structure represents one example of a record of that table:

```
struct media_table_record
{
    int media_id;
    int starting_time_stamp;
    int ending_time_stamp;
    int proprietary[13];
} media_record_table[ ];
```

The media_id field contains a unique identifier for each media device, static or removable. The starting_time_stamp and ending_time_stamp fields may represent the start and end of the interval for which network traffic is stored on the media, although the use of these fields is not required. The proprietary field may contain other implementation specific information or alignment padding as desired.

A segment super block map 510 contains a set of segment map tables, holding records for each super block of a logical stream segment. the following C structure offers presents one implementation of a segment map record:

```
struct  segment_map_record
{
        struct
        {
                int     universal_stream_id;
                int     logical_segment_id;
                int     starting_time_stamp;
                int     ending_time_stamp;
                int     super_block_number;
                int     proprietary[3];
                struct
                {
                        int  media_id;
                        int  media_offset;
                } location[4];
        } segment_map_table[ ];
} master_segment_map_table[ ];
```

The universal_stream_id field contains the universal stream identifier of the stream from which the packet data of the segment was captured. The logical_segment_id field contains the identifier of the logical stream segment containing the packet blocks of the segment. The starting time_stamp and ending_time_stamp fields contain the start and end times of the interval over which the packet data was captured. The super_block_number field contains the unique number of a particular super block in the logical recording stream. The location structure contains the location of the super block by specifying the media identifier and offset in the media_id and media_offset fields. In this example, four locations for each super block are provided whereby a super block may be redundantly stored in four locations on the same media or different media.

Super block data sections 512 are stored with the above maps and tables shown, and may be arranged on the media as may be desirable. Media may also contain free space 514 which may be allocated for the storage of additional super block data sections as needed.

One example of media formatted to a preferred network recording cache format has the organization represented by the following C code structure:

```
struct  media_format
{
        struct  section_map_record  section_map[1024];
        union
        {
                struct universal_stream_record   table1[65536];
                struct segment_table_record      table2[262144];
                struct media_table_record        table3[262144];
                struct segment_map_record        table4[256];
                struct packet_block              table5[256];
        } sixteen_meg_super_blocks[ ];
}
```

Segment Archive Systems

Referring again to FIG. 2, a segment archive subsystem 214 may be provided in conjunction with a segment caching subsystem 210 to form an unbounded hierarchical storage management system. The segment archive subsystem 214 controls the migration of data between fixed storage media 216 and removable storage media 218.

In one system of the invention, the segment archive subsystem manages removable media devices, robotics and media for the network recording system. It relies on the segment cache subsystem to access and update the universal stream database, the master segment database, and the master media database, and to update records in the segment map tables. That segment archive subsystem also uses information in the universal stream database to determine which streams are to be archived, and how and when to move the cached contents of logical stream segments intended to be archived to removable storage media.

That segment archive subsystem mounts and unmounts removable storage media on removable storage devices. When a particular media is mounted, the segment archive subsystem evaluates the media to determine whether or not it has been formatted, for example, with the network recording removable format of FIG. 6. To copy network data from fixed storage media to removable storage media, that segment archive subsystem first queries the segment cache subsystem to determine where the segment super block is cached. That segment archive subsystem then reads an entire super block into memory and writes the super block to removable storage media. Upon success, that segment archive subsystem notifies the segment cache subsystem to update the segment map table information and mark the super block for re-use.

As super blocks are copied from fixed storage media to removable storage media an in-memory table of contents, which contains a universal stream record, logical stream segment identifier, super block number and removable media location, is updated.

Figure 6:
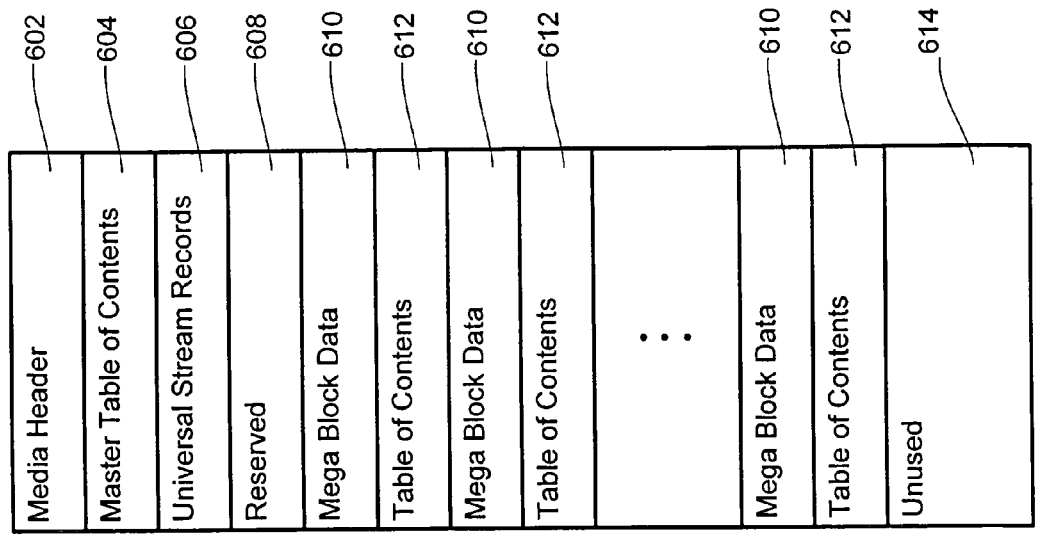
FIG. 6 depicts a network recording removable format.

In one system of the invention utilizing the format of FIG. 6 the segment archive subsystem writes a marker, followed by the in-memory table of contents, and another marker after a completed mega block is written to the removable tape storage media. A mega block in this system is a collection of super blocks, forming a unit of storage. If the removable storage media is dismounted, or if the data partition becomes full, the directory partition of the removable storage media is updated with the media header, the master table of contents and the universal stream record table.

Network Recording Removable Format

FIG. 6 illustrates a format for removable storage media containing network traffic data referred to as the network recording removable format. The format divides the media 600 into two portions, a directory and a data partition. The directory partition includes a media header 602, a master table of contents 604, and a set of universal stream records 606. A reserved portion 608 may also be included in the directory partition as may be desired for future use, or as padding. In the data partition is a number of paired sections, the pairs including a mega block data section 610 and an intermediate table of contents section 612. An unused portion 614 of the media may also exist if the end of the media does not coincide with the end of a table of contents section.

The media header 602 contains information as exemplified by the following C language structure:

```
struct  media_header
{
        int  signature[4];
        int  media_id;
        int  media_state;
        int  beginning_time_stamp;
        int  ending_time_stamp;
        int  proprietary[1024 − 8];
}
```

The signature field provides a signature identification for media used by a segment archive subsystem. The media_id field contains an identifier unique to the media the header resides on. The media_state field indicates the state of the media, for example new, opened for writing, closed, or read-only. The beginning_time_stamp and ending_time_stamp fields indicate the interval of time during which the stored network traffic was sampled.

The master table of contents section 604 contains the logical recording stream identifier and super block numbers for each super block of data stored on the removable storage, as exemplified by the following C language structure:

```
struct table_of_contents_record
{
    int universal_stream_id;
    int logical_segment_id;
    int beginning_time_stamp;
    int ending_time_stamp;
    int super_block_number;
    int media_id;
    int media_offset;
    int proprietary[9];
} master_toc[ ];
```

The universal_stream_id field contains the universal stream identifier of the stream from which the packet data of the segment was captured. The logical_segment_id field contains the identifier of the logical stream segment containing the packet blocks of the segment. The starting time_stamp and ending_time_stamp fields contain the start and end times of the interval over which the packet data was captured. The super block_number field contains the unique number of a particular super block in the logical recording stream. The media_id field indicates the identifier of the media which contains the super block. The media_offset field indicates where on that media the super block resides. The proprietary field may contain other implementation specific information or alignment padding as desired. This table of contents structure provides for storing table of contents records for multiple pieces of media. This allows the segment archive system to access the contents of multiple pieces of removable storage media by reading a single piece of media.

The universal stream record section 606 contains a complete universal stream record for each logical recording stream having stored data on the media. As removable media pieces are imported, the entries in the universal stream record section can be copied to the local universal stream database.

The following C language structure exemplifies a directory partition described above:

```
struct
{
    struct media_header            header;
    struct table_of_contents_record master_toc[262144]
    struct universal_stream_record  streams[65536];
    int    future_use[ ];
} directory_partition;
```

In the example format data partitions include a number of paired sections, the pairs including a mega block data section 610 and an intermediate table of contents section 612. In that format the intermediate tables of contents are 64 kilobyte tables. On sequential media, such as tape, it is preceded and followed by a file mark. This format for the table of contents facilitates the recovery of data due to failure. The following C language structure exemplifies the structure of those data partitions:

```
struct
{
    struct
    {
        struct packet_block packet_blocks[256];
    } super_block[256];
    int    tape_mark[1024];
    struct table_of_contents_record intermediate_toc[1024];
    int    tape_mark[1024];
} data_partition[ ];
```

Parallel Network Recording

Systems of the invention provide high availability and failover capabilities through parallel network recording. Parallel network recording uses redundant network recording machines attached to a single network segment, as in FIG. 1b, in order to provide high availability. The network recording machines may be connected to an administrative network. The network recording machines may be independently attached to fixed or removable storage media, and may also be attached to a storage area network (SAN).

Since each machine is connected to the same network segment, the packets captured by each machine are identical. The redundant machines use the same universal stream definitions to filter and cache a logical recording stream in parallel. If one machine fails the others continue to capture network traffic, insuring against loss of network recorded data.

Parallel network recording can be accomplished without synchronization by merely attaching multiple network recording machines using the same universal stream definitions to the same network segment. Since the data is stored and annotated with the universal stream definitions and hierarchical time-based indexing, a packet extraction system can query either the redundant network recording machines, or collect and collate the recorded data.

Parallel network recording can operate synchronously where the network recording machines coordinate and validate the recording of network packets. A full or partial parallel checkpoint algorithm is used to detect and report inconsistencies and errors between the machines. Additional synchronization gap records may be added to the logical recording stream to indicate those state inconsistencies, errors and gaps. A packet extraction system utilizes these records to fix anomalies while collating and retrieving logical recording stream data.

In fully redundant mode, each network recording machine independently produces an archived copy of the data stream on removable storage media. Multiple archive copies are produced which protect the data against the failure of a single piece of media or network recording machine. In a fail-over mode, each network recording machine caches captured stream content on fixed storage media. Only one selected primary archive machine saves the recorded network packets to removable storage media. Failure of the primary archive machine is detected by communicating synchronization messages over the administration network with the other redundant machines. When synchronization message are no longer communicated, one of the other machines becomes the primary archive machine, insuring that network packets are archived without data loss. If synchronization messages include identification of the archived network data, the failover mode may only produce a single archived copy of the logical recording stream.

A parallel checkpoint algorithm is now described, which may be used to validate the integrity of parallel network recorded data. Synchronization occurs at the beginning of each logical stream segment. At configured packet intervals, in one example every 100,000 packets, the network recording machines exchange synchronization information to validate the integrity of the recorded packets. Each packet is numbered relative to the beginning of the logical stream segment.

During the synchronization process, each network recording machine creates a packet profile of the incoming packets, and stores then in a profile table. Packet profiles may be created, for example, by calculation of a 32 bit checksum or cyclic redundancy check on the packet data. When that table becomes full, it is sent to the other redundant network recording machines. When profile tables are received at a network recording machine, the table is compared to the contents of the local table. If the tables are identical, exactly the same packets are considered to have been received by the local machine and the machine sending the received profile table, and no error is detected. If the tables are not identical an error is detected, in that one of the network recording machines is considered to have dropped or corrupted a packet resulting in skewed packet numbers. Regardless of the result of the comparison, each network recording machine may continue to cache and archive sampled network packets.

If an error is detected, each network recording machine performs a table search to locate matching packet sequences, by which dropped packets may be detected. If a matches are found, the number of lost packets can be calculated, and the machine having dropped the packet identified. The machine having dropped a packet creates a gap record corresponding to the time which packets were received by another machine, and adjusts the packet numbers for all successively received packets. This is necessary so that the local record of the logical recording streams will be identical between network recording machines and archives made therefrom. The other network machines having captured a packet dropped at another machine may create an error record noting the error.

If the table search does not produce a match, a second level of synchronization may be attempted to determine the extent of the lost data and to bring all of the redundant network recording machines back into synchronization.

Distributed Network Recording

In some cases the amount of data passing through a network segment will exceed the bandwidth of the available storage of a single network recording machine. Through distributed network recording, two or more network recording machines sampling the same network segment may act in distributed fashion to divide the network traffic storage tasks between the machines. Because each machine samples the same network segment, the packet streams captured by each machine are identical. In systems of the invention the distributively configured network recording machines use the same universal stream definition to filter and cache the packets in parallel, however each machine only caches a part of the logical recording stream to its accessible fixed storage media. For example, machine A might record to fixed storage only traffic for oddly numbered seconds, and machine B might record the remaining traffic. For packet data not stored due to distributive storing, gap records are inserted into the logical recording stream denoting the gap in recording locally. Distributively configured network recording machines must operate synchronously; each network recording machine must coordinate and validate the recording of network packets with the other machines. In some distributed systems of the invention time synchronization is achieved through a network communication, for example using the NTP protocol, and in other systems time is read from a radio signal such as a GPS signal. In those inventions, the assigned recording times for the distributed machines will be somewhat overlapped to allow for latency of communicating time data. Thus for the example above, machine A might record traffic in oddly numbered seconds plus traffic for an additional 100 milliseconds, and machine B might record traffic in evenly numbered seconds plus an additional 100 milliseconds. In that example, machine A and B may have a synchronization error of up to 100 milliseconds without loss of captured network traffic data. A full or partial checkpoint algorithm may be used to detect and report inconsistencies and errors between the machines. Distributively configured network recording machines may divide the work up using many possible criteria, such as by time interval, capacity thresholds, or other criteria as will be understood by those skilled in the art.

Multiple network recording machines may also be provided in redundant and distributed configurations, providing both high availability and high performance recording of network traffic.

Network Replay Machines

Figure 3:
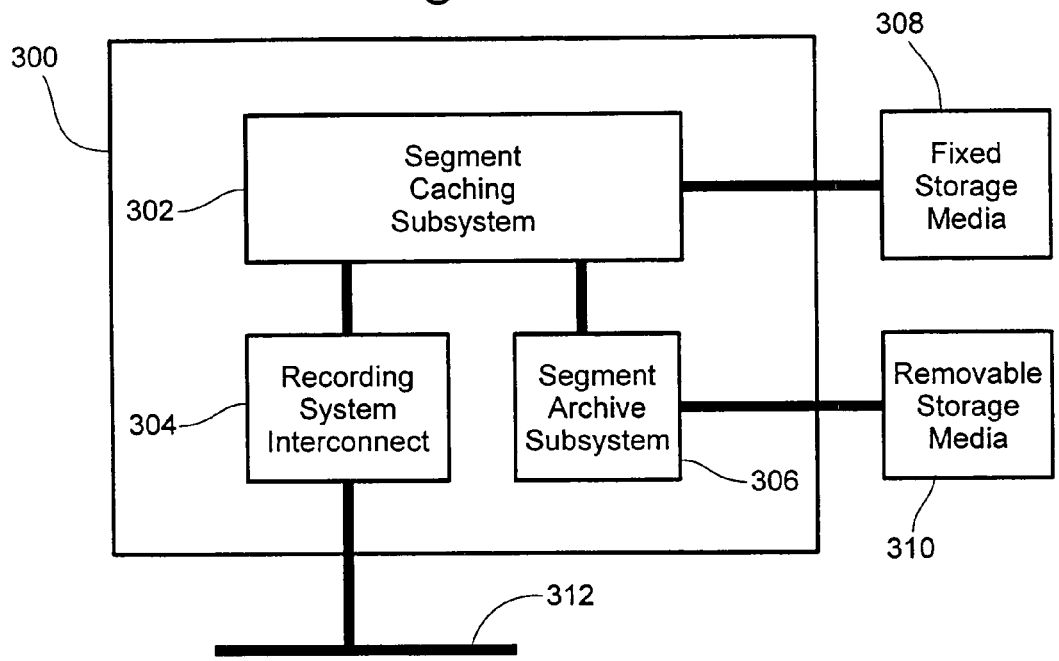
FIG. 3 depicts the components of one example of a network replay machine.

In general, a network replay machine is a computing machine which does not include a network capture device or a stream filter subsystem, and operates to deliver captured network data to clients, for example a packet extraction system, over an administrative network. Referring to FIG. 3, an example network replay machine 300 includes a recording system interconnect 304 by which communication is sent and received to clients on an administrative network 312. A segment caching subsystem 302 serves to provide caching and channeling functions to and from one or more fixed storage media devices 308, a segment archive subsystem 306, and clients through recording system interconnect 304. Fixed storage devices may be SAN devices, as described above. A segment archive subsystem 306 handles data to and from one or more removable storage media devices 310, as requested by segment caching subsystem 302, or as necessary as removable storage media pieces are inserted and removed. Segment caching subsystem 302 and segment archive subsystem 306 may serve comparable functions as their counterparts in network recording machines.

Packet Extraction Systems

In systems of the invention a packet extraction system manages requests for recorded network traffic data from clients. A packet extraction system may be configured to communicate with one or more network recording machines and network replay machines to respond to a request for network traffic data. A packet extraction machine may exist as a component of a network recording machine or network replay machine. The packet extraction system, upon receiving a request, queries the configured network recording and network replay machines using the included recording system interconnects. The request to the machines will normally include filter criteria so as to request only information relating to some task rather than the entire information stored on the network recording and network replay machines. The network recording and network replay machines respond to a request by accessing the requested data from fixed storage or by migrating the data from removable storage, filtering out only the requested data, and returning the filtered data to the requesting packet extraction system. The returned data may then be subsequently filtered to reduce the amount of data delivered to the client requester.

Certain other packet extraction systems are configured to request and receive data from multiple network recording machines and network replay machines in distributed fashion. In those systems the packet extraction system calculates an efficient approach to retrieving the data from the configured network recording and network replay machines. Retrieval commands are then sent to the machines, using the calculated time ranges and other filter options, the entire set of retrieval commands serving to retrieve the entire data set required by the client request. A packet extraction system may utilize the error packets and gap packets produced by redundant or distributively configured network recording machines when mining data to create an accurate view of network recorded packets.

Administrative Consoles

Administrative consoles may be provided in systems of the invention to provide local or remote user interfaces to display current or historical status, or to configure and manage the stream filter subsystems, network recording interconnects, segment caching subsystems and segment archive subsystems of network recording machines or network replay machines. In some systems of the invention the user may allocate and format fixed storage devices and partitions for use by segment cache subsystems using an administration console. A user may also provide logical recording stream definitions through some administration consoles by selecting a network recording machine from a list, a source network capture device and an associated network packet stream from a single network segment. The user may then choose to capture all or a filtered portion of interest of the total sampled packets. A user may also configure defined logical recording streams to be independently cached, archived or retrieved.

In systems of the invention administrative consoles facilitate the configuration of multiple network recording machines in redundant, distributed, or redundant and distributed configurations. In some systems of the invention administrative consoles facilitate the configuration of logical recording streams to create new logical stream segments manually, or to configure the automatic creation of new segments based upon time intervals or capacity thresholds. Administrative consoles may, in some systems of the invention, facilitate the configuration of the caching and archiving options affecting the behavior of segment caching subsystems and segment archive subsystems with respect to handled logical recording streams. Those caching options may include the amount of time the recorded data may remain in the cache before being flushed, or the number of redundant copies a segment caching subsystem is to maintain. Archiving options may include the selection of either time interval or capacity based migration of sampled data from cache to removable storage media.

When a new universal stream definition is created, some systems create a universal stream record assigning a new logical stream identifier, and then update the universal record tables on all fixed devices of the system. Afterward the user may start the recording of network data by activating a logical recording stream.

In systems of the invention an administrative console allows users to monitor all the logical recording streams on a full time network recording system. The user can query performance statistics, such as total packets sampled, total bytes sampled, and traffic rates such as packets or bytes per second. Through those administration consoles the user may also manually force segmentation or archiving of logical recording streams.

In systems of the invention administrative consoles also facilitate the retrieval of recorded network data. In one type of retrieval the primary elements of a search are the universal stream definition and a time interval. Each network recording machine contains a list of all logical stream segments, and a list of media storing captured data, both having annotated time ranges and universal stream definitions. Through an administrative console the user may open a particular segment for retrieval, which causes coordination between segment cache subsystems and segment archive subsystems to move the selected super block of interest into cache.

Retrieval of Hierarchically Stored Network Data

Systems of the invention store captured network data in a hierarchical structure, such as the structures of FIGS. 4, 5 and 6. When stored, each packet is associated with a time and each group of packets is associated with a time interval including a start and end time. As a side effect of the capture process, packets become generally stored in sequential order within a packet group structure. One effective way of managing and retrieving a massive number of accumulated packets is to specify a time window during which the events of interest took place. This method of storage and retrieval can reduce the number of qualifying packets by up to several orders of magnitude, thus making feasible the operation of identifying small groups of packets that relate to some specific event. The use of a time window criteria constitutes an efficient first filter operation, upon which successive filter operations become efficient through the processing of reduced quantities of packets. After groups of packets have become identified within a time window, further filtering through use of server-side indexing or client-side packet data field comparisons may take place.

Figure 7:
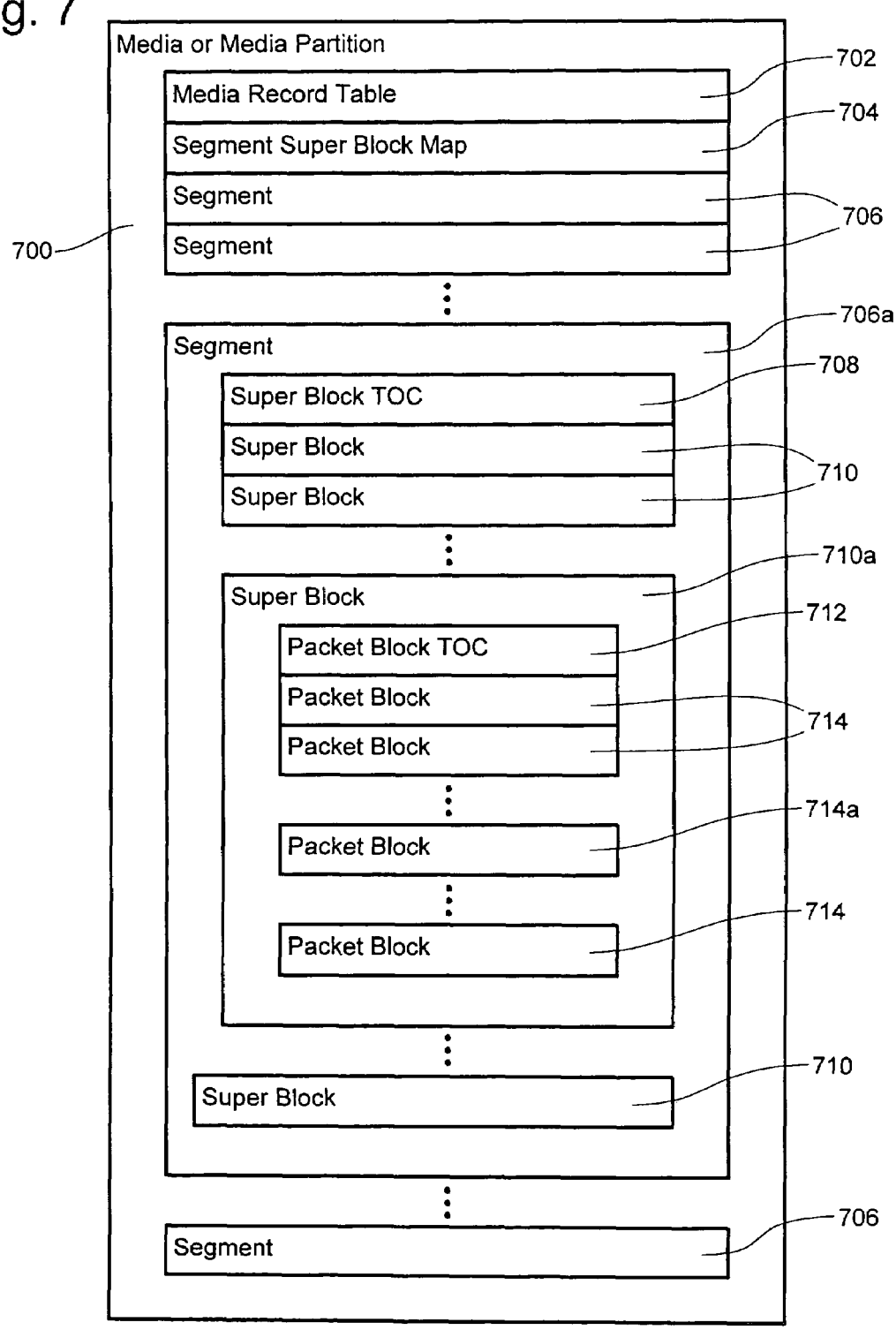
FIG. 7 depicts one hierarchical storage scheme suitable for fixed storage devices.

Discussion of one example of a lookup or filter procedure is given in relation to the media storage illustrated in FIG. 7. A media device or media partition 700 contains a hierarchical structure wherein is stored network packet data. A media record table 702 contains the starting and ending time extents for which data is stored on the entire media or media partition 700. A segment super block map 704 is provided, containing starting and ending time extents for a succession of segments 706 wherein network packet data is stored. Each segment 706 contains a series of super blocks 710 and a super block table of contents 708 wherein the starting and ending time extents for the contained network data are stored. Each superblock 710 contains a packet block table of contents 712, for which the starting and ending time extents of a series of packet blocks 714 are stored.

The illustrated lookup procedure begins with a selection of an interval for which packets are to be looked up. On a client device, such as an administration console, the interval is entered and a request submitted to one or more lookup devices containing lookup facilities, for example a network recording machine, a network replay machine, or a packet extraction system. The lookup device then reads the media record table 702, testing for the presence of any data on the media within the requested interval. If the media record table 702 indicates there is no data existing on the media 700 within the interval, a message is returned indicating that status. Otherwise the procedure continues to read the segment super block map 704, to determine which of the segments 706 contains network data for the requested interval. If the interval is large, this determination may indicate that multiple segments fall within the interval and must be processed. A small interval may result in a determination that only one segment 706*a* contains data within the specified interval. The procedure then continues to the next level, reading superblock TOCs of the interval, for example the super block TOC 708. A determination is made as to which superblocks contain data within the requested interval. Again, large intervals may encompass several superblocks 710, and small intervals may involve only a single superblock 710*a*. For each superblock within the interval 710*a*, the procedure may continue in that the packet block TOC 712 is read to discover which packet blocks fall within the interval. Upon discovery of these packet blocks the packet data, the addresses of the packet data, or other packet information may be returned to the client device.

A number of requests may be formed by a client, by which either the data or the information of the data may be returned. The procedure may also be carried out to higher or lower levels in the hierarchical organization. For example, a system that either caches network data or processes large quantities of sequential network traffic may request network data in super blocks for efficiency. That system might be useful for performing multiple searches through the data, for example looking for textual patterns, addresses, or binary fingerprints. Another system may request network data in smaller blocks, such as packet blocks or individual packets, which might be useful if limited memory is available.

High Performance Multi-Processor Architectures

Systems of the invention may implement multi-processor systems with shared memory to provide additional bandwidth to and from storage. In some systems of the invention a SAN is provided over a Scalable Coherent Interface (SCI) mesh, with multiple processors providing bus communication to storage devices. Those systems permit the concurrent storage of high-bandwidth network traffic, such as over 100 Mbps or 1000 Mbps network segments, and retrieval of that network traffic for analysis. Other types of high speed backbones and backplanes may be used without departing from the scope of the invention.

Sliding Time Window Interface

Figure 8:
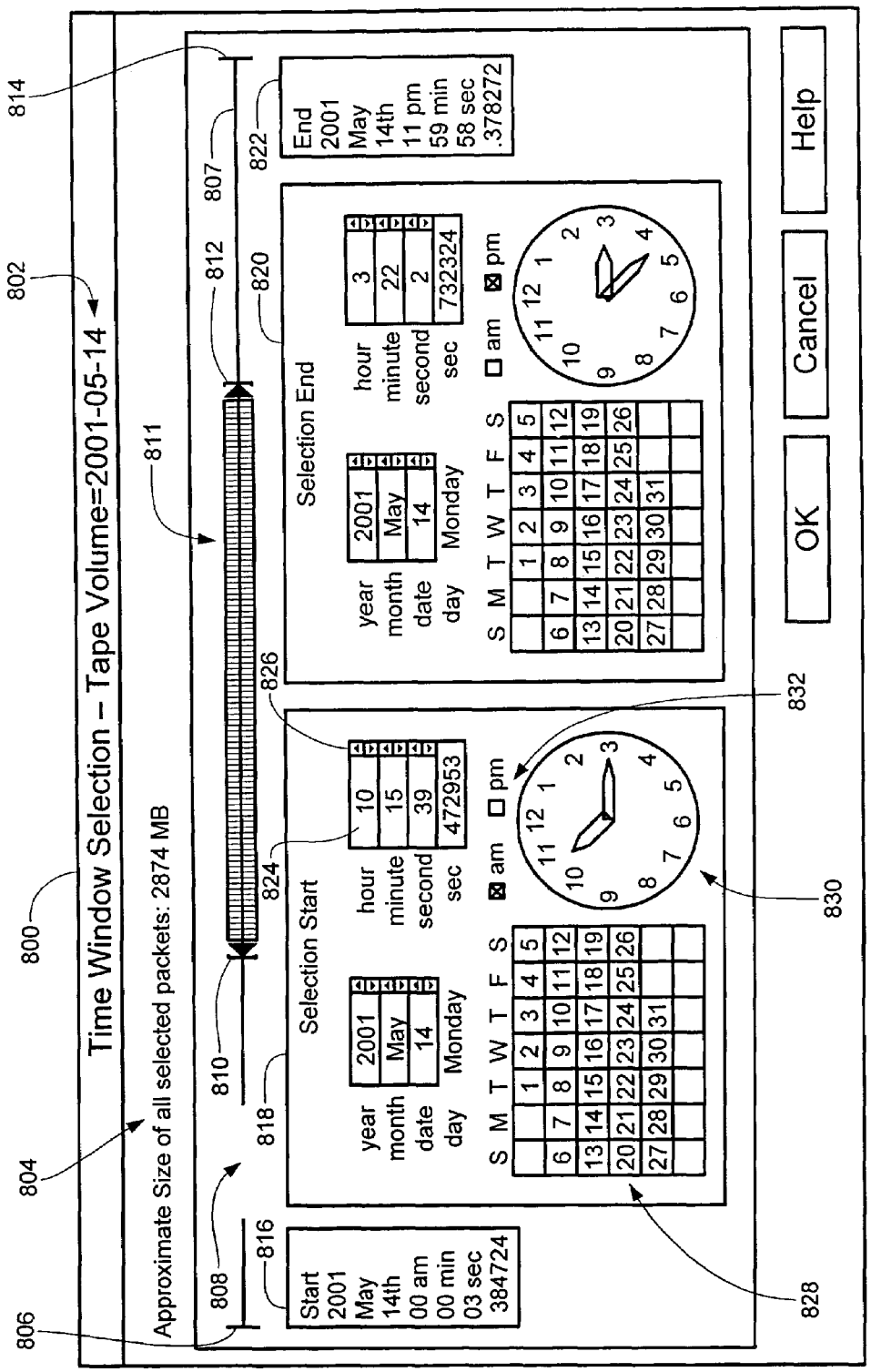
FIG. 8 depicts a graphical interface utilizing a sliding time window.

One system of the invention utilizes a sliding time window interface, as shown in FIG. 8. A window 800 is presented containing a number of widgets or devices whereby information concerning a particular piece of media is presented. Window 800 may include indication of the identity of the piece of media 802. Representation for the start time and end time for the network information stored on the media may be represented in text boxes 816 and 822, respectively, or by other graphical or textual elements. A selection start box 818 and a selection end box 820, or other equivalent graphical groupings, associations or devices, are provided to permit selection and display of a desired time period. A graphical timeline 807 is provided to indicate visually the selected portion of the network data of the media, using the selection start and end times. Graphical timeline 807 contains data start and end features, in this example lines 806 and 814, representing the first and last times for which data is stored on the media. Selection start and end features, in this example arrowheads 810 and 812, are provided whereby a user may change the selection start or end time, for example by dragging the arrowheads. Visual block 811 represents the selected data of the media between the selected start and end times. A gap in the line 808, grayed out portion, or other device may be included to indicate times for which there is no data available, for example a logical recording stream with gap records inserted.

For selection start box 818 or selection end box 820, a number of widgets or devices may be included. For example text boxes, such as 824, may provide display or user entry of time specifications, such as the year month, date, day, am/pm selection, hour, minute, second, millisecond, microsecond, and other time specifications. Spin buttons, such as 826, may also be included to permit interaction with the time specification elements by pointing device. In the example of FIG. 8, radio buttons such as 832 are provided to display or select am or pm times, and may be used to specify and display other time information. A calendar 828 may be provided to display date or day information, and in some systems of the invention also permit selection of a calendar date. A visual clock 830 may also be provided to display or select a time of day. Calendar 828 and visual clock 830 may be helpful entry elements in that a specific date may not be memorable by itself, but in combination with the calendar and clock a user may be prompted by his recollection of an interesting day of the week, a major event, or a periodic event. An indication of the amount of selected data 804 may be provided, which may assist the user to select an appropriate amount of data for which processing resources are available. Indication 804 may be an approximation, if calculation of this value requires more resources than are available or desirable. A change in the start or end selection times, in this example, will be reflected in each of timeline arrowheads 810 and 812, in selection start and end boxes 818 and 820, and in indication 804.

Other interfaces with similarity to that shown in FIG. 8 containing displays for media information and manipulative objects for selection of a time interval are possible; the form shown in FIG. 8 is merely one example implementation of the invention. Some described elements of FIG. 8 may be removed while retaining necessary functions. For example, if fine graduations of time specification are not necessary, elements of time specification beyond the desired graduation may be omitted without disturbing the main functionalities. In other systems of the invention, time displays and selections are by other time systems, such as 24 hour time format and time systems using non-local time systems such as greenwich mean time or "zulu" time. Other interfaces, including textual, graphical, monochrome, color and others, including a multitude of display devices are considered within the scope of the invention.

In an alternate graphical interface of the invention, timeline 807 is enclosed in a zoomable window. In that interface a zoom in and a zoom out button are provided to change the zoom factor of the display. In that interface a start and end text box are displayed which show the visible time extents of the timeline. In another interface of the invention, a time window length area is provided showing the length of the selection interval of the timeline. The time window length area may optionally be editable by a user, and may have fields of days, hours, minutes, and seconds. A lock checkbox may also be provided fixing the time window length, such that a user sliding arrowheads 810 or 812 will move both the start and end selection times, maintaining the time window length.

In another alternate graphical interface of the invention an IP address selector is provided permitting a user to select packets of the currently selected time window. In that interface a list of IP addresses of the packets of the time interval may be shown. That list of IP addresses may optionally be selectable, whereby a user may select an IP address from the list by clicking, for example, on the desired IP address displayed in the list. An entry of "all IP addresses", or equivalent, may be provided to remove an IP address filter criterion. An entry field may be provided whereby a user may enter an IP address rather than selecting from a list. A display of the total kilobytes currently selected may also be provided. A display of the number of packets selected may also be provided. A series of radio buttons may also be provided whereby a user may select a sorting factor to sort the list of IP addresses, examples of sorting factors being the IP address, the number of kilobytes of data encompassed by the packets of an IP address, and the number of packets for an IP address. A port entry list may also be provided whereby a user may enter one or several ports providing a filter criterion to apply to packets of the selection interval. A size transfer limit entry box may also be provided to limit the amount of packets to select, overriding for example the selection end time with an end time corresponding to a selected amount of network packet data.

The following pseudocode demonstrates how to compute a minute or hour value from the position of a mouse pointer after a drag operation changing the position of one hand of a displayed clock:

```
// compute direction in quadrant degrees
qDeg = arcTangent(absoluteValue((Py-Cy)/(Px-Cx)))
// adjust direction to compass orientation
If (Px >= Cx AND Py >= Cy)    // Quadrant=1
    cDeg = qDeg
Else If (Px < Cx AND Py >= Cy)    // Quadrant=2
    cDeg = 180 – qDeg
Else If (Px < Cx AND Py < Cy)    // Quadrant=3
    cDeg = 180 + qDeg
Else // Px >= Cx AND Py < Cy     // Quadrant=4
    cDeg = 360 – qDeg
// compute hours or minutes, based on whether/not in the zone of the hour
hand
If (squareRoot((Px-Cx)^2 + (Py-Cy)^2) > Rh)    // in minute hand zone
    Tm = cDeg/6
Else // in hour hand zone
    Th = cDeg/30
```

Where Px and Py are the position of the pointer x and y coordinates when the drag is released, Cx and Cy are the x and y position of the center of the clock face, Rh is the radius or length of the displayed hour hand, Tm is the current minute time and Th is the current hour time. The above example may be extended to Cartesian systems of varying orientations, more sophisticated methods of determining which hand is intended to be changed, and extensions in other ways as will be understood by those skilled in the art.

Selection and Retrieval Systems

FIG. 9 illustrates a processing system of the invention. A processor 900 is configured to receive input from input device 908, which may be, for example, a keyboard, mouse, other input devices, or combinations of input devices suitable for receiving input from an operator. A display 902 controlled by processor 900 is provided to communicate to an operator items of status, settings, and other information. A media device 904 contains fixed or removable media whereon network traffic information is stored. Processor 900 communicates with memory 906, by which software may be loaded and executed. Memory 906 is not specific to location, and may be located externally or internally to processor 900 as desired. Memory 906 may be volatile or non-volatile storage, for example hard disk storage, flash, floppy disk storage, or RAM. A storage device 910 interfaces with removable or fixed media 912, whereon computer executable instructions are stored. The computer executable instructions may facilitate the display and interaction as described in FIG. 8, for example. Other computer readable instructions may facilitate the filtering of network data recorded to media of media device 904, or other software functions described in this writing.

Figure 10:
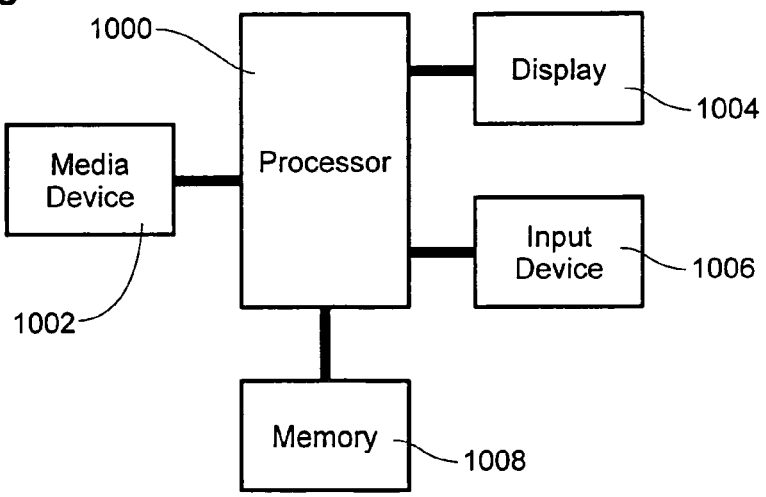
FIG. 10 illustrates another computing system of the invention.

FIG. 10 illustrates another processing system of the invention. A processor 1000 is configured to receive input from input device 1006, which may be, for example, a keyboard, mouse, other input devices, or combinations of input devices suitable for receiving input from an operator. A display 1004 controlled by processor 1000 is provided to communicate to an operator items of status, settings, and other information. A media device 1002 contains fixed or removable media whereon network traffic information is stored. Processor 1000 receives computer executable instructions contained in memory 1008, and executes those instructions at desirable times. Memory 1008 is not specific to location, and may be located externally or internally to processor 1000 as desired. Memory 1008 may be volatile or non-volatile storage, for example hard disk storage, flash, floppy disk storage, or RAM. The computer executable instructions may facilitate the display and interaction as described in FIG. 8, for example. Other computer readable instructions may facilitate the filtering of network data recorded to media of media device 1002, or other software functions described in this writing.

Figure 11:
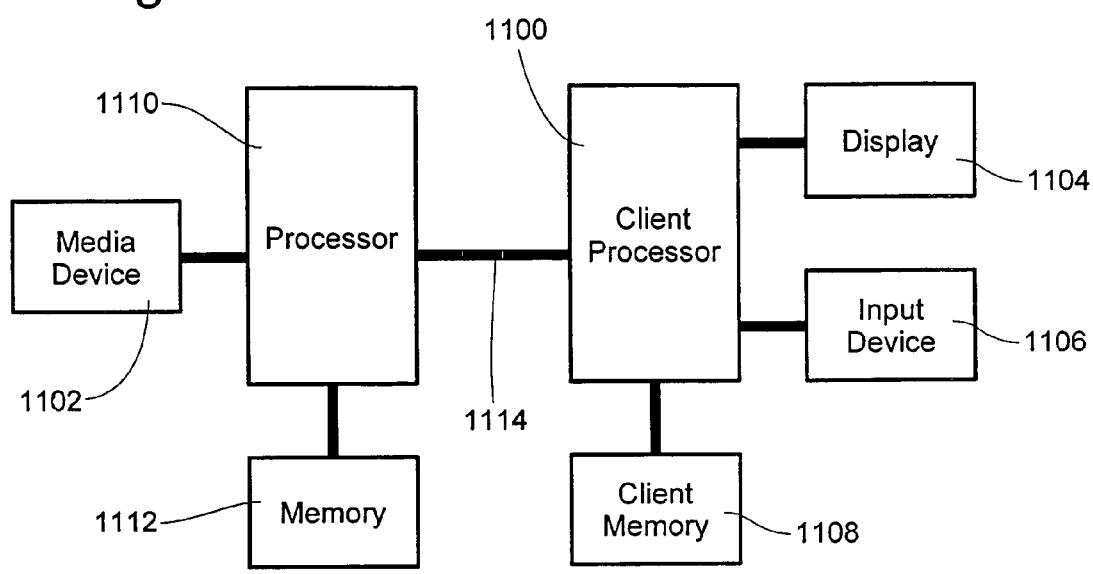
FIG. 11 illustrates a client/server computing system of the invention.

FIG. 11 illustrates a processing system of the invention in a client-server configuration, whereby network data may be selected, filtered, or retrieved. A client processor 1100 is configured to receive input from input device 1106, which may be, for example, a keyboard, mouse, other input devices, or combinations of input devices suitable for receiving input from an operator. A display 1104 controlled by client processor 1100 is provided to communicate to an operator items of status, settings, and other information. Client processor 1100 receives computer executable instructions contained in client memory 1108, and executes those instructions at desirable times. Memory 1108 is not specific to location, and may be located externally or internally to client processor 1100 as desired. Memory 1108 may be volatile or non-volatile storage, for example hard disk storage, flash, floppy disk storage, or RAM. The computer executable instructions contained in client memory 1108 may facilitate the display and interaction as described in FIG. 8, for example. In some systems of the invention processor 1100 and attachments may be included in an administration console. A processor 1110 having memory 1112 is in operable communication with a media device 1102 containing media whereon network traffic information is stored. Processor 1110, memory 1112, and media device 1102 may be included within a network recording machine, network replay machine, packet extraction system, or other server system. Processor 1100 may request the computer executable instructions contained in memory 1112, and execute those instructions as desired. Those computer readable instructions contained in memory 1112 may facilitate the reading, filtering and forwarding of network data recorded to media of media device 1002 to client processor 1100. Client processor 1100 and processor 1110 are connected by and contain necessary hardware for a communications link 1114, for example by a network connection, a point-to-point connection, or other connection as will be understood by those skilled in the art. Client processor 1100 may send requests to processor 1110 through link 1114, and receive responses thereby. One example of a request and response are a request for the start and end of the time interval for which data is stored to media on media device 1102. Another example is a request and appropriate response for a list of hierarchical elements, such as segments, super blocks, mega blocks, packet blocks and packets, stored to the media and matching a filter criteria, for example data recorded within a particular time interval, A further example is a request for the network data containing a particular hierarchical element, and an appropriate response. Other requests may be included as desired to improve the operation of the system.

Processor systems, such as the systems described in FIGS. 9, 10, and 11, may also include memory caches of network data to reduce the necessity to perform read or write operations to disk or other media. Systems such as those described in FIGS. 9 and 10 and subsystems of those systems are suitably included in network recording machines and network replay machines.

The following pseudocode describes a recursive linear interpolation algorithm suitable for locating efficiently a block containing data of a specified time on media having packets stored in sequential order:

```
structure location {integer start, integer end}
integer BT=locate (BF, BL, F, L, T)
integer Procedure locate (bf, bl, f, l, t)
Local integer bt;
bt=bf+(bl–bf)*(t–f)(l–f)
bt_start=lookup_start(bt); get first time on storage unit(bt)
bt_end=lookup_end(bt); get last time on storage unit(bt)
If (bt_start t AND t bt_end)
    Return bt
Else If (bt_start<t)
    Return locate (bf, bt–1, f, bt_end, t)
Else
    Return locate (bt+1, bl, bt_start+1, l, t)
```

In this example code, F is the earliest time stamp of the media, L is the latest time stamp of the media, T is the specified time, BF is the index of the first storage unit, and BL is the index of the last storage unit.

Filters for Network Traffic Data

Some filter systems of the invention filter sampled network traffic data to arrive at smaller data sets for processing. Those systems allow a user to select from and combine a variety of filter criteria. Several matching expressions may be compared against raw captured data, including time windows, bytes, text, addresses, ports, and protocols. Other matching expression qualifiers can specify metadata such as DHCP sessions, HTTP transactions, and other items indexed by a capture or processing engine. Examples of items that are indexable by a capture or processing engine are the source IP address, the destination IP address and the port of an IP packet. Additional packet level information that may be used in the filter are packet size and error flags or packets.

In those systems a filter is specified by a filter expression, which is a combination of one or more matching expressions. Systems of the invention use logical operators to relate matching expressions in a filter expression. Those logical operators include the AND and OR operators. A matching expression may include four parts: a qualifier, a relational operator, a value, and a format. A qualifier is either a numeric or symbolic offset in a packet, or the name of an annotation of a packet or processing engine. A value is a value to be compared with the data of the qualifier of a packet. A format may specify the type of value or comparison, for example numeric, string, binary, network address, network address mask, etc. Relational operators relate the qualifier to the value and may have many possible settings, for example numeric equal, not equal, greater than, less than, greater or equal to, less than or equal to, string and textual operations such as includes, not includes, equal, not equal, regular expression, case sensitive and insensitive operations, etc. For example, if the set of network traffic destined for a particular network workstation was desired, a matching expression might be constructed with a qualifier of "destination address", a value of the network address of the workstation, a format of "network address", and a relational operator of equal.

Some systems of the invention graphically display a tree of matching expressions hierarchically nested inside logical operators. The most useful of the logical operators are the AND and the OR operators, although other logical operators may be used if desired. Those systems of the invention may build and maintain binary tree structures related by logical operators in memory, expanding the tree as new matching expressions are added. If several matching expressions linked by the same logical operation appear in a sequence if increasing levels of nesting, those matching expressions may be reduced to visually occupy a single row or column. For example, "(((a AND b) AND c) AND d)" may be represented by a single column of AND logical operators as "(a AND b AND c AND d)". If a filter contains only a single matching expression, no boolean logical operator need be shown. In some systems the AND relational operator has precedence over the OR operator. Other systems which evaluate the filter expression in different orders and precedences, such as OR first, left to right, etc., are considered within the scope of the invention.

In some graphical interfaces of the invention, the interface provides the facilities for a user to dynamically generate and reposition expressions in a hierarchy of logical operators forming a filter expression. Some interfaces are unbounded with regard to the depth of matching expression nesting or the total number of matching expressions that may be included in a filter expression. Those interfaces may adapt by displaying horizontal scroll bars, vertical scroll bars, or both to allow a user to view the filter tree.

Some filter systems of the invention may apply efficiencies of individual matching expressions and reorder the application of a filter expression to achieve an efficient search. This is especially helpful when using annotated or indexed data from an annotating capture engine or processing engine. For example, a filter expression might be constructed to gather the set of packets containing particular text destined for a particular IP address, in a specified time frame. In a system having data annotated by time, the first expression to be evaluated would produce the set of packets in the specified timeframe. The IP address indexed expression would be applied next, because the search involves retrieval of pre-indexed packet from an annotating capture engine. The last and least efficient expression to be applied tests for the text contained in the packet, potentially at a client. Because this test is last there will be a greatly reduced packet set on which to perform the relatively expensive textual search. Depending on the types of data indexing included with the data, this method may result in a client having to retrieve relatively few non-matching packets. Efficiency ratings may be generated for each branch of a filter tree of logical operators and matching expressions. This allows for efficient masking off of unnecessary raw packet storage to retrieve only those packets that are needed for comparisons at a client.

FIG. 12 illustrates a graphical user interface that may be used to enter and manipulate filter expressions of matching expressions. Referring to FIG. 12a, a packet filter dialog box 1200 appears in an initial state, having a title bar 1202, a default offset combo box 1204, an add matching expression button 1220, a delete matching expression button 1222, a load button 1224, a save button 1226, and other widgets. The default offset combo box 1204 controls the initial value of offset selector 1208 of new matching expressions, or may be used to override those settings. Expressions may be added or deleted through buttons 1220 and 1222. Filter expressions may be loaded and saved through buttons 1224 and 1226.

A matching expression entry is displayed including and expression selector 1206, an offset selector 1208, a qualifier entry 1210, a relational operator entry 1214, a value entry box 1216, and a format entry 1218. A drop down list of qualifiers 1212 is shown, as appears when a user clicks on the arrow of the qualifier entry 1210. The shown qualifiers are representative of symbolic offsets that might be used; others may be used without departing from the invention. An expression selector 1206 may be checked by default when a matching expression is created in the user interface. The expression selector 1206 enables application of the particular matching expression by the filter, whereby the particular matching expression is used when filtering packets. If the selector is not checked, the matching expression is ignored. If an unselected expression is combined through a logical operator with a selected matching expression, the filter may consider the unselected expression to be true, or other value that will not reduce the set of matching packets by the filter. The offset selector specifies the origin to where the qualifier offset is referenced, for example an ethernet MAC header or an IP header. A qualifier combo box 1210 is used to specify a literal or symbolic offset into packets, or a symbolic metadata identifier. The relational operator entry 1214 specifies the relational operator to apply for the matching expression. The value entry 1216 specifies a value to apply. The format entry 1218 may direct the filter to consider the value and the referenced value of the qualifier to be of a specific format.

A packet filter may by default specify values to do typical packet data filtering, which may be based on a specific hexadecimal value at a specified offset from the packet's MAC header, the value being supplied by a user.

Referring now to FIG. 12*b*, a user has entered a single matching expression 1228, searching for packets with a destination address of 192.168.2.12, the destination address read relative to the start of the IP header, the values having an IP address format. To make this entry, a user might first select the default offset of IP header in the default offset combo box 1204. The user might then select the symbolic qualifier of "destination address" in the qualifier combo box. After a qualifier has been selected, the format entry may be automatically filled in the interface to avoid requiring the user to make the entry. In this example the value of "IP" is entered in the value entry box. Note that literal qualifiers may be also used. In this example a qualifier of "16", which is the offset of the IP destination address in the IP header, is an equivalent value. It is believed that most users will prefer symbolic addresses, relieving them from the requirement of remembering the literal structure of the various network headers. The value of 192.168.2.12 is entered as text into the value entry box and interpreted in dot-delimited IP address notation, or other notation specifying an IP address. For MAC addresses, the entered value may be in standard hexadecimal, colon-delimited format.

Figure 12C:
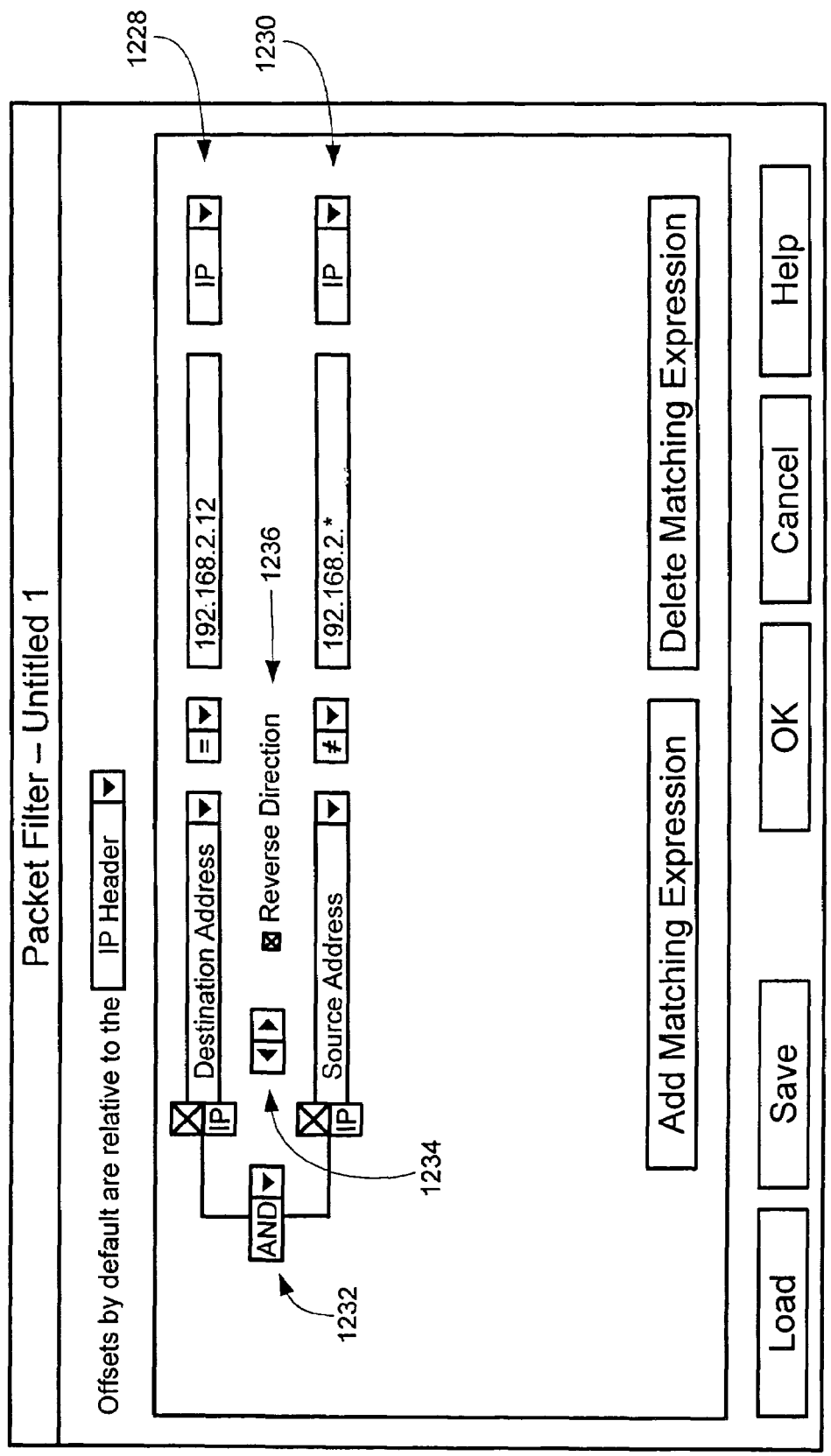
FIG. 12 depicts a filter expression entry interface.

In this discussion a user desires to add a matching expression. Referring now to FIG. 12*c*, a user has clicked on the "add matching expression" button 1220, causing the interface to add a second matching expression 1230 linked by a logical operator 1232. The interface may copy a related expression to provide default values for a new expression. With the presence of combinations of matching expressions, repositioning arrows 1234 are displayed to permit a user to move an expression up or down in the filter expression hierarchy. Also included with the presence of two or more combined source and destination address expressions is reverse direction checkbox 1236, which specifies that the filter expression or a sub-expression will also apply to packets with the source and destination reversed to gather packets in the reverse direction. In this example the user has entered further specification of the packets not having a source address from the network 192.168.2.0/24, using a not equal operator.

Some systems of the invention use a simplified, efficient matching expression relation in which the logical operators that connect the matching expressions are binary, in that they relate exactly two matching expressions. When another matching expression is introduced, the default rule of those systems is that the matching expression will be connected by an AND logical operator with the previous matching expression, unless the previous matching expression has already been connected directly to another matching expression, rather than to another logical operator, by a logical operator. In that case, a new, higher-level logical operator is introduced connecting the new matching expression with the logical operator of the previous matching expressions. This behavior, as well as the default logical operation (AND or OR) for new logical operators, may be configurable.

Figure 12D:
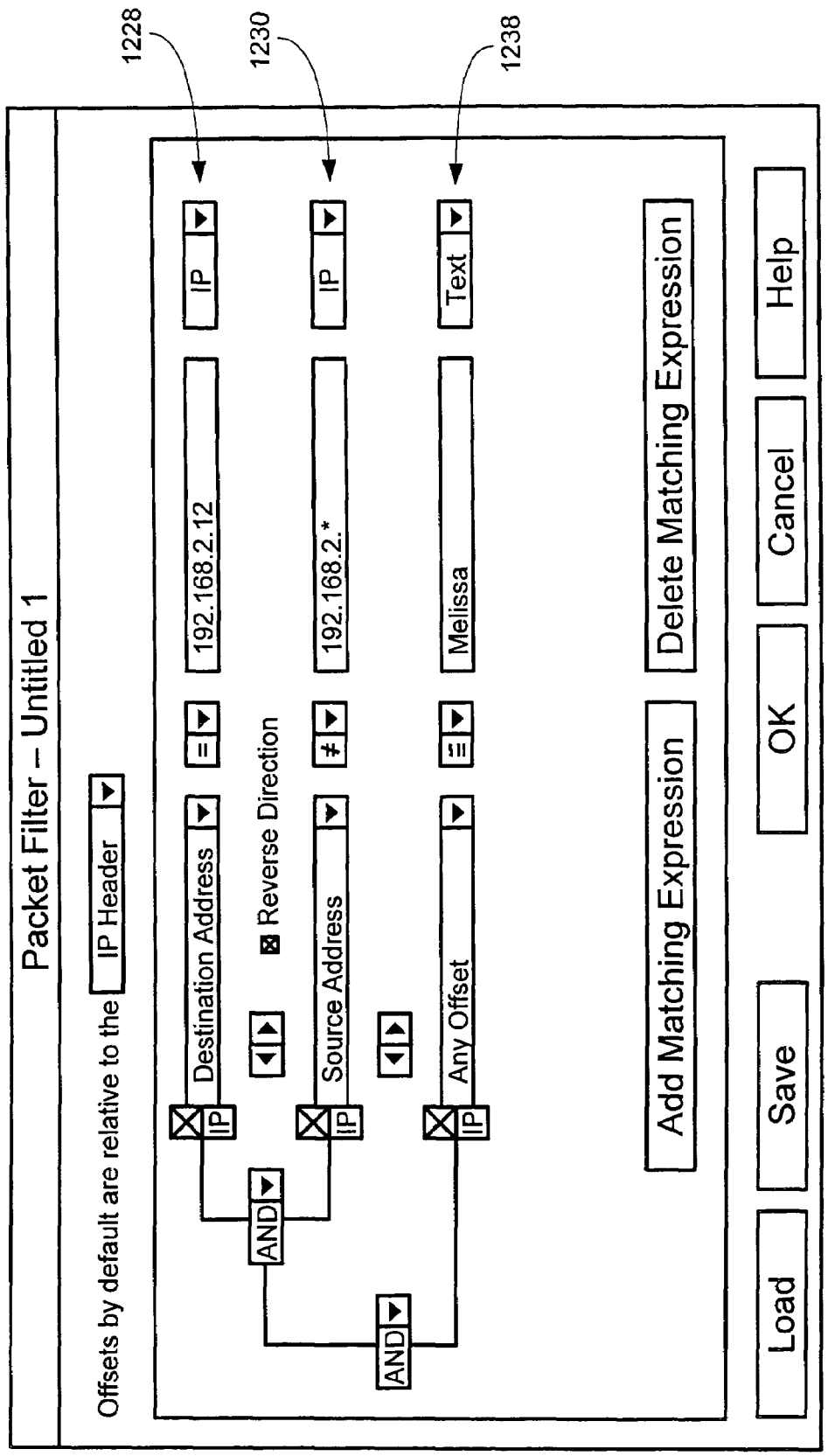

Referring now to FIG. 12*d*, a user has added a third matching expression 1238 specifying only packets containing the text "melissa". In the third matching expression 1238, a qualifier of "any offset" is given to provide for the text located at any position within a packet. Also in the third expression 1238, the relational operator is a case-insensitive equals, which will match the text value without regard to letter upper or lower case. Further in the third expression 1238, the desired textual value is entered into the value entry box and the format of "text" is entered into the format text box.

Figure 12E:
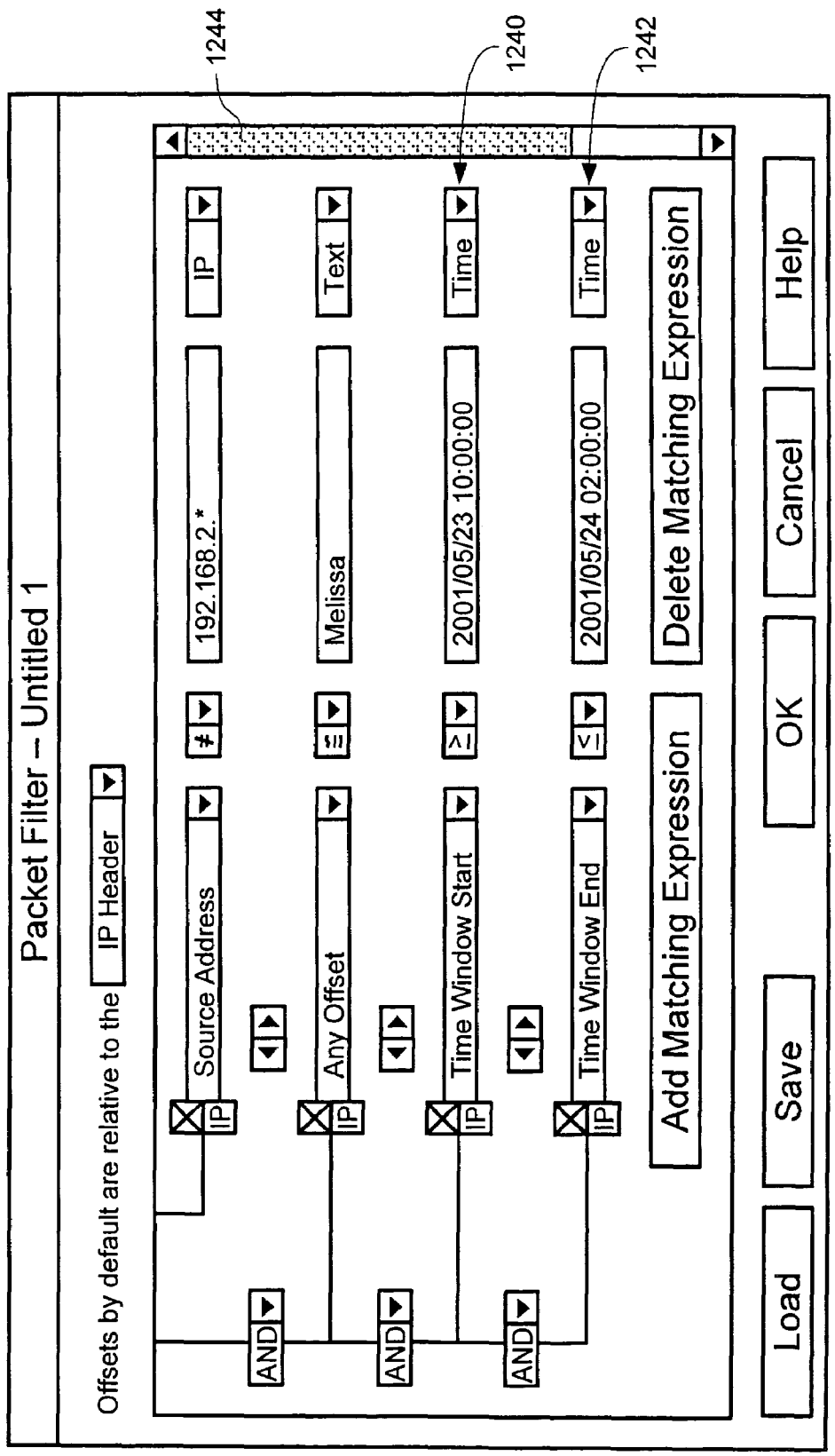

Referring now to FIG. 12*e*, a user has added a fourth matching expression 1240 and a fifth matching expression 1242 specifying a time interval. With the addition of these expressions the filter expression tree has become too large to display in the packet filter dialog box 1200. The interface has therefore restructured packet filter dialog box 1200 to include a scrolling window controllable by scroll bar 1244. Qualifiers of fourth and fifth matching expressions, 1240 and 1242, are time window start and time window end, with time values being entered as values, thereby defining a time interval. Relational operators greater than or equal to, and less than or equal to, are used to fashion the matching expressions using the time window start and end times. The format for these is "time" for which format suitable definitions are provided including a "YYYY/MM/DD hh:mm:ss" format where YYYY is the 4 digit year (the last 2 digits being an acceptable substitute), MM is the month (where 01 or 1 is January), DD is the day of the month, hh is the 24-hour clock hour (in the range of 0 to 23), mm is the minute of the hour (0 to 59), and ss is the second of the minute (0 to 59), with leading zeros being optional. Other time formats, such as UNIX style epoch based integer timestamps may be used. After the selection of a time window qualifier, the interface may automatically enter "time" in the format entry box, and may enter the current time into the value box. The interface may also automatically relate two matching expressions with time window qualifiers with an AND logical operator, as will usually be desired. Likewise, an advanced interface may also automatically create a pair of time window qualified matching expressions with appropriate relational operators and format values, if the user creates a new matching expression and assigns a time window qualifier. If a user desires that the search be open-ended, either backward or forward in time, the corresponding time window matching expression may be deleted.

Other relational operators may be used than shown in FIG. 12; a partial list being: equals, not equal to, less than, less than or equal to, greater than, greater than or equal to, case sensitive equals, case insensitive equals, and sounds like.

In an alternate system of the invention the filter display may be invoked from a packet decode display, perhaps being capable of searching through sequences of packets. To do this, a user selects either a decoded protocol-specific field or raw hexadecimal or text field and then selects "filter", or similar selection, from a local menu or icon. The packet filter display is then invoked with the qualifier preset to that literal or symbolic offset, unless raw text or hexadecimal was selected, in which case the qualifier might be set to "any offset". The relational operator is set to equal, the value set to the selected value and the format set to the best known format of the selected value in the decoded packet. If the resulting filter is applied to the packet decode display, each packet in the packet decode display will retain its unique packet number, but only the filtered packets will appear in the packet decode display.

Another menu item or icon a packet decode display, "search now", may also be implemented to immediately search through packets already present in the packet decode display, according to what is selected, or keyed in, the packet decode display. That display automatically scrolls to and displays the next packet which is positively returned by the filter, which in one usual case has the same value at the specified offset, or in the case of a raw text or hexadecimal selection, the packet has the same value at any offset).

Using methods described above, creating a new matching expression may depend on the context in which it is created. The following pseudocode describes one context sensitive creation method:

New_MatchingExpr(me_num, qualifier_type)
Load configuration logic
If creating the second node of a pair,
    If pairable node (e.g., qualifier_type is IP Address),
        Copy new qualifier, same as pairable node, except invert relational operator, value incremented per configuration
    Else
        Create new qualifier the same as previous node
Else
    Create a generic qualifier In some systems of the invention each matching expression is assigned a weight. Weights will vary based on the typical efficiency of retrieval. The efficiency might vary based on several factors. One factor might be whether or not a value is referenced by index from a packet or other header. Another consideration might be how likely the matching expression is to produce a small set of matching packets relative to the other matching expressions. Another factor might be the typical efficiency of a particular block-level filtering operation used to make a comparison or search, for example a complex case-insensitive search verses a direct comparison of an IP address.

When applied to hierarchical systems which time index sequential network traffic, the operation of filtering a set of network traffic against a time filter criteria becomes simplified. For example, if a filter expression requires network traffic between times A and B, the operation may first query available storage if there is any network data on those drives between A and B. Because the time extents are maintained for the storage media, this query executes quickly. The operation may then make successive queries on subsets of the recorded data, for example through the tables of contents of logical stream segments, superblocks, and packet blocks to efficiently locate that portion of the data being requested. When applied to systems which record network traffic in sequential order, the operation of filtering may still proceed efficiently using a binary search, or interpolated search as needed.

In either of those type of systems, matching expressions utilizing a time window qualifier may execute more efficiently. In those systems, and efficiency calculation for those matching expressions may be evaluated to be most efficient. In other systems storing network traffic in an order not sequential nor hierarchical, the efficiency calculation will evaluate similarly to other types of matching expressions.

Figure 13:
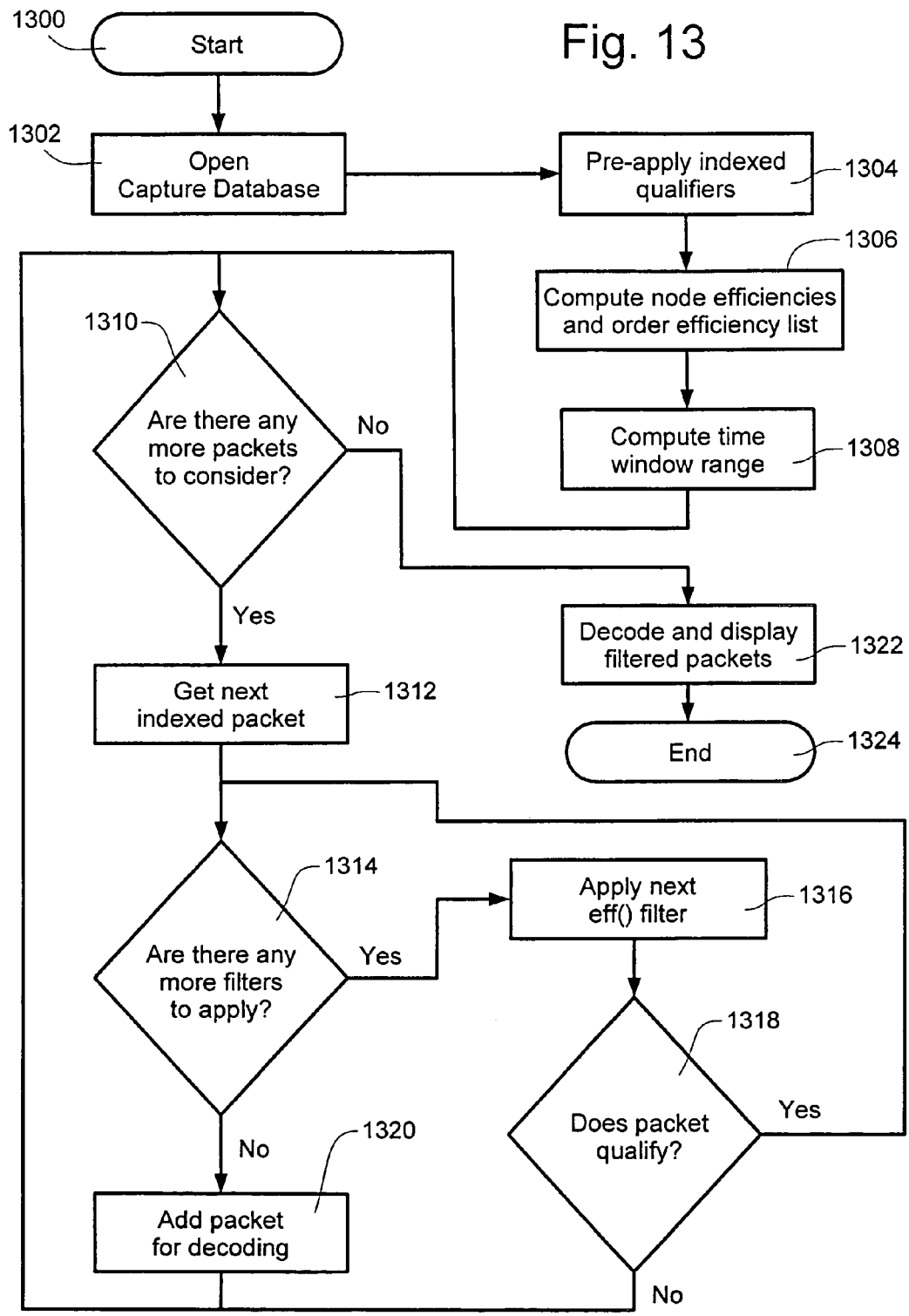
FIG. 13 illustrates a procedure of filtering based on efficiency ratings.

In systems of the invention, once all matching expressions are entered and organized, a procedure is used to efficiently retrieve and filter data, one such procedure illustrated in FIG. 13. The first step of the procedure is to open a capture database 1302, which might include opening local storage, or connecting to a server containing network data such as a network replay machine or packet extraction system. Next, those matching expressions that are indexed by the capture or processing engine are pre-applied to packet block request structures. Afterward, in step 1306, a modified filter tree is created, and the qualifiers of step 1304 are accepted. The efficiencies of nodes of the filter tree are then linked, and filtering operations are pre-ordered according to a combination of node efficiency and logical operation precedence and nesting, as described below. Next, the time window qualifiers are analyzed and a time window encompassing the superset of time window qualifiers of the filter expression are identified in step 1308. The set of packets within the superset time window range are either noted or loaded. Next, in step 1310, a loop is begun with a decision as to whether or not all noted packets have been processed. If more packets need to be processed step 1312 is executed, otherwise step 1322 is executed. In step 1312 the next packet is fetched from local or remote storage. In step 1314 a decision is made as to whether or not there are remaining filters to apply. If yes, step 1316 is repeatedly executed applying each filter in order of best efficiency. If the decision of step 1314 evaluates to no, then all filters have been applied and the packet may be found to be within the parameters of the filter. In that case, step 1320 executes which adds the packet to a list of passing packets, which may be afterward displayed or processed. If at least one filter has yet to be applied, the loop executes through step 1318 in which a decision is made as to whether or not the result of step 1316 qualifies the packet as being inside the parameters of the filter. If yes, execution proceeds to step 1314, which will cause the next most efficient filter to be applied. If no, execution returns to step 1310 to fetch and evaluate the next packet. After execution of step 1320, adding a passing packet to a list, execution continues in step 1310 to consider the next unprocessed packet. If in step 1310 there are no further unprocessed packets, execution proceeds to step 1322, in which the packet list may be considered and processed. In the example of FIG. 13, the passing packets are decoded and displayed for a user having an interest in certain packets as specified by a filter expression. The following psuedocode demonstrates an algorithm which may be used to compute an efficient order in which to retrieve or filter packets:

Compute_eff( )
For each Matching Expression qualifier type,
    If it is enabled,
        //compute effectiveness metric
    Else
        //use fake effectiveness metric, so AND or OR parent can evaluate
For each Logical Operator (except for top-level AND series),
    in order by nearness to Matching Expressions, then top-to-bottom,
    If both children are disabled,
        eff[lop_num]=0
    Else If one child is disabled,
        Inherit enabled child's effectiveness metric
    Else,
        //compute effectiveness metric
For matching expression nodes, the effectiveness may be a product of both the intrinsic difficulty in performing a search to the point that a matching packet may be in hand, inversely combined with the ability to focus on a relatively small number of relevant packets. For both intermediate AND and OR logical operations the effectiveness in practice has been found to be much the same, even though there are usually a greater number of matching nodes for the OR operation. To evaluate the efficiency of a branch of a filter expression tree, the following procedure may be used. First, each matching expression is assigned a weight value, the weight value reflecting the ease of which the operation of the matching expression may be performed. For example, a computationally simple operation such as a time index search in time-based hierarchically stored data might have a high weight of 1.0. A computationally intermediate operation, such as an operation on an indexed value like a source or destination address, might be assigned an intermediate weight of 0.90. A computationally intensive operation, such as a string search, might be assigned a low weight of 0.50 or lower.

In some systems of the invention, counts are maintained for specific packet values at specific indexes. For example, a capture engine may increment a counter for each IP source and destination address of each sampled packet. When a network traffic storage volume is closed, the counters contain the number of packets sent to specific IP addresses, and also sent from other specific IP addresses. This information may facilitate the determination of an efficiency value, as shown in the following efficiency equation:

matching expression effectiveness=((total_packets−#packets)/total_packets)*weight In the above equation, the total_packets value is the set of packets that may yet pass the filter expression. At the beginning of a search total_packets is the number of packets available for retrieval. The total_packets value may be adjusted as filtering progresses, if desired, although recomputation of the efficiency values may not yield a significant improvement to the search to justify that recomputation. The #packets value is the value of the counter maintained by the capture system containing the number of packets stored having the specific value. The weight value is the assigned weight as described above.

The above equation will yield larger effectiveness values for particular matching expressions that reduce the packet set of consideration to a greater degree. This is helpful, because a reduction in the number of packets that must be considered for successive matching expressions will reduce the total computation in a linear fashion. If the #packets value is not available, for example because the capture system did not maintain a count, the following equation may be used to calculate the effectiveness:

matching expression effectiveness=weight

For this equation, the weight value may be adjusted toward lower values to bias the order of matching expression application in favor of matching expressions with better known behavior.

To evaluate the effectiveness of a sub-tree of the filter expression, the following equations may be used:

intermediate AND effectiveness=child1.effectiveness*child2.effectiveness intermediate OR effectiveness=child1.effectiveness*child2.effectiveness Other relationships for the logical operators combining matching expressions into filter expressions may be used, and are considered within the scope of the invention.

An example effectiveness computation for a filter expression tree branch combining two bounding matching expressions of time window operations follows:

time window AND effectiveness=(((2*total_packets)−child1.#packets−child2.#packets)/total_packets)*((child1.weight+child2.weight)/2)

The application of the filter may generally proceed as follows. First, effectiveness values are computed for the individual matching expressions. Second, each combining logical operator is assigned an effectiveness value, progressing from the matching expressions to the top of the filter expression tree logical operator. Third, the filter expression tree is traversed, favoring the branches having higher effectiveness values for earlier evaluation.

Figure 14:
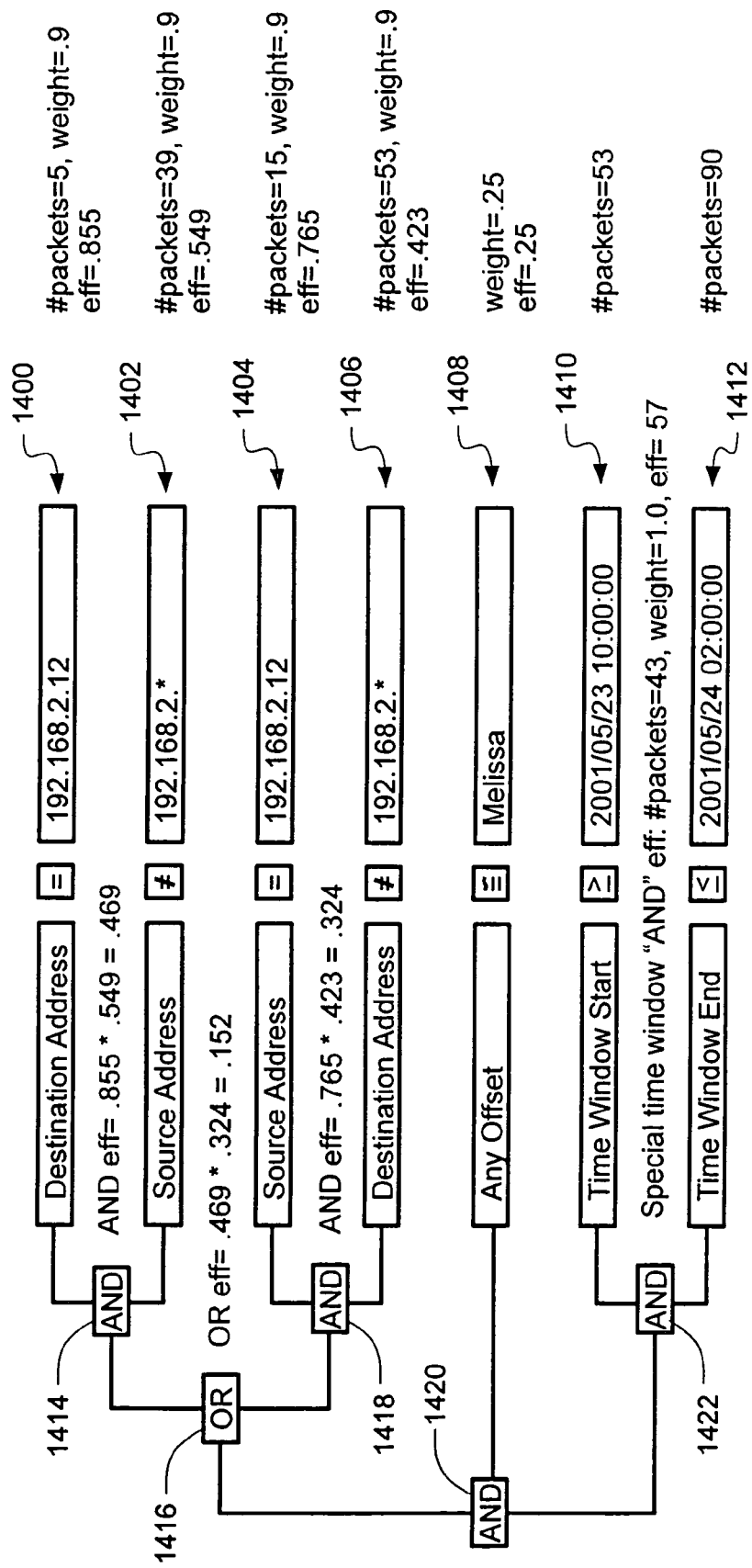
FIG. 14 shows by example one efficiency rating calculation scheme.

Referring to FIG. 14, the efficiencies of a search as given in FIG. 12 are calculated. Matching expressions 1400, 1402, 1408, 1410, and 1412 have been entered by a user, as in FIG. 12. Matching expressions 1404 and 1406 are automatically generated, as the user had selected filtering in the reverse direction. Matching expressions are combined by logical operators 1414, 1416, 1418, 1420, and 1422 to form a filter expression. The effectiveness calculations are performed for the matching expressions. Where possible, each matching expression is compared to the available packets by index. In this example, there are 100 packets available for retrieval. Matching expression 1400 is compared against the count of packets maintained by the capture engine, which shows that 5 available packets were sent to 192.168.2.12. Likewise, matching expressions 1402, 1404, and 1406 are compared with the result of 39, 15, and 53 available packets match. Efficiencies are computed for these indexed matching expressions using the equations given above, yielding the efficiency ratings of 0.855, 0.549, 0.765, and 0.423. In this case, matching expression 1408 cannot be compared against an index, because index information has not been provided to perform a string search. A weight of 0.25 is assigned, which becomes the efficiency rating. Matching expressions 1410 and 1412 form a bounding time window expression, and use a special calculation. First, the bounding time interval is used to determine the number of available packets within the time window, with 53 packets after the start and 90 packets before the end, or 43 packets within the time window. A weight of 1.0 is assigned, and using the calculation above an efficiency of 0.57 is determined at the AND logical operator 1422. At AND logical operator 1414, the efficiency is calculated as the product of the child efficiencies to be 0.469. Likewise efficiencies of logical operator 1418 is calculated to be 0.324. The efficiency of operator 1416 is calculated to be the product of the efficiency of the child expressions, which is 0.152. The efficiency of the top level operator need not be calculated, but would be the product of the efficiency ratings of operator 1416, operator 1422, and matching expression 1408. The filter expression tree is then traversed. At top level operator 1420, three children are presented. Child operator 1422 is first traversed, as is has the highest efficiency rating of the three. A first set of intermediate matching packets is produced. The child having the next best efficiency rating is then applied, which is matching expression 1408, producing a second intermediate matching packet set. Because the top level operator 1420 is an AND, the second intermediate matching packet set is the intersection of the set produced by the child expression of 1422 and matching packet set 1408. Thus the first intermediate set need not be retained, and may be destructively applied in application of successive filter expressions. Having applied the child expressions of 1422 and 1408, the child expression of 1416 is then applied. Because operator 1416 is an OR expression, the resulting product will be the union of the intermediate matching packet sets of the child expressions 1414 and 1418. Thus the second intermediate set will have to be retained until the last child expression is executed. At operator 1416, child expression 1414 is traversed, yielding a third intermediate matching packet set. Child expression 1416 is also traversed, yielding a fourth intermediate matching packet set. The final matching packet set for the entire filter expression tree then becomes the union of the third and fourth sets.

In an alternate system of the invention, the AND logical operator effectiveness is computed using the following equation:

intermediate AND effectiveness=1.0−((1.0−child1.effectiveness)*(1.0−child2.effectiveness))

In that equation the AND node effectiveness is computed in such a way as to reward the removal of as many non-qualifying packets as possible, thus the efficiency increases from the effectiveness of the children toward 1.0. For example, if the children of and AND have weight adjusted effectiveness metrics of 0.7 and 0.4, the AND node's effectiveness would be computed as (1.0−(0.3*0.6)), or 0.82.

Unlike the reward strategy for AND nodes, the OR operator is "fined" because it tends to increase the number of qualifying packets, thus its effectiveness is decreased downward to 0 from the effectiveness of either child node. The following equation, presented earlier, is used to compute effectiveness for OR operators:

intermediate OR effectiveness child1.effectiveness*child2.effectiveness

Using the example above, combining using OR rather than AND, the effectiveness would be computed as (0.7*0.4) or 0.28.

In that alternate system the following algorithm may be used for computing the effectiveness metric for each matching expression node and logical operation node of a filter expression tree. Special logical expression nodes are considered for pairs of time window type matching expressions and also pairs of capture engine indexed matching expressions, for example, expressions directed to indexed IP addresses of the data. When encountered they must be considered leaf nodes when the filter expression tree is traversed. The effectiveness for these special logical expression nodes may be computed as follows:

1. Looking to recursively traverse the filter expression tree form the root node down, all AND logical operation nodes are considered equivalent, until OR logical operator nodes or leaf matching expression nodes are encountered.

2. The node hierarchy of these equivalent AND nodes is adjusted so that the two most efficient child nodes are first paired and their AND effectiveness computed; this AND effectiveness is then considered to be a leaf node. For cases where an OR logical operator is encountered, steps 1 and 2 are recursively applied on each of its AND logical expression child nodes; the OR node's effectiveness is then computed in reverse order as the recursion unfolds.

3. Repeat step 2 until all but the root AND node have been computed.

Time window matching expressions, where the children of a logical operation node are a starting time and an ending time, are computed as follows:

1. The effectiveness metric for an AND logical operation node is 1.0.

2. There is no effectiveness metric for an OR logical operation node. The user interface may prevent this combination from being selected.

Paired capture engine indexed matching expressions, for special cases such as source IP address in combination with a destination IP address, are computed as follows:

1. The effectiveness metric for an AND logical operator is 0.99.

2. The effectiveness metric for an OR logical operator is 0.50.

Many other schemes for computing efficiency ratings are contemplated, and are within the scope of the invention.

Web Session Reconstructors and Displays

Some systems of the invention include web session reconstructors for translating web sessions included in a stream of network data to visual interpretations for a human. A web session, for the purposes of this section, is a network correspondence of one or more user selected network requests and one or more responses from network hosts. Examples of web sessions are web browser sessions and ftp sessions. FIG. 15 illustrates one web session reconstruction system of the invention. A packet interpreter 1502 contains facilities for receiving a stream of capture data from a capture data source 1500. Examples of capture data sources are a network replay machine, packet extraction system, a local file or raw data, delivered in a variety of ways such as locally provided storage devices such as disk or tape, ethernet network, a storage area network, and pipes. Packet interpreter 1502 functions to decode incoming data to an associated protocol, for example, the TCP/IP protocol. Packet interpreter 1502 passes interpreted data to a multi-packet recompiler 1504 which parses interpreted packets according to request or response, and organizes incoming packets into a sorted list. In systems of the invention multi-packet recompiler 1504 functions to parse HTTP, HTTPS, and FTP request and response packets. Multi-packet recompiler 1504 may operate on and interpret packets of other protocols without departing from the scope of the invention. After packets have been sorted in a sorted list, multi-packet recompiler 1504 reconstructs the data into files and structures in preparation for presentation, also creating directories and files of the request/response packets to local storage. If during the process of recreating files and directories, a file is found having script attributes, that file may be noted, by location, in a script master list 1506. A file has script attributes if it can be executed by an interpreter, for example an HTML, Javascript, multimedia file, or ASP (Active Server Pages) file. A script master list 1506 may be used to display web pages in chronological order. In some systems of the invention, recreated files are added to a cache directory of an installed web browser. In operation of a web browser, the browser may review the cache directory and prefer to load cached content over retrieval over a network or local directories. In some systems of the invention script files are not added to the browser cache. In those systems files non script files, such as graphics files, are typically added to the cache.

Figure 16:
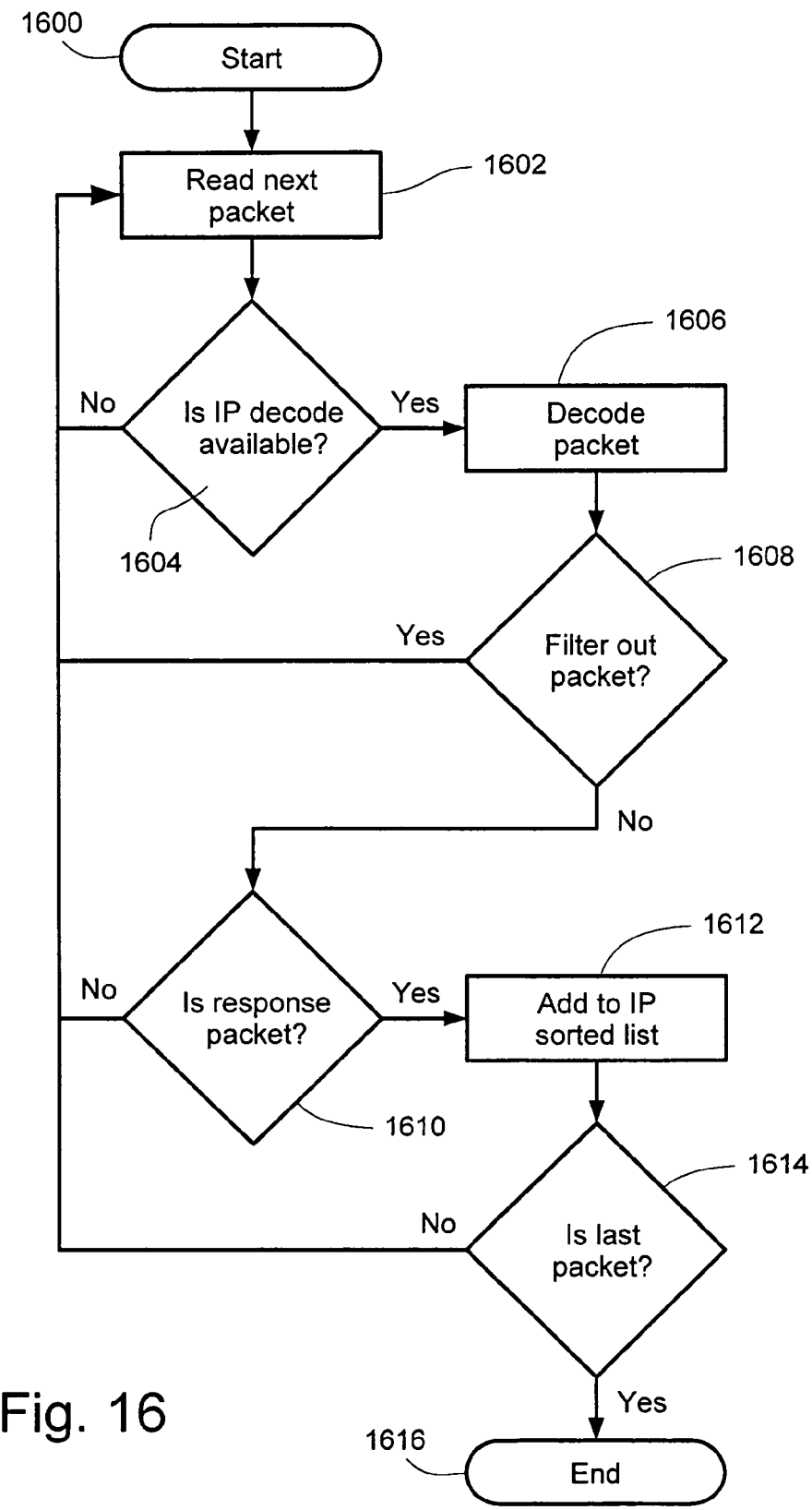
FIG. 16 depicts one procedure by which a packet interpreter may operate.

The flow chart of FIG. 16 illustrates one method by which packets may be interpreted, for example, by a packet interpreter. In step 1602 a packet is read. In step 1604 a decision is made as to whether or not a decode module is available for the packet, and if so the packet is decoded in step 1606. In one system of the invention, decode modules are provided for TCP/IP packets. In step 1608 a branch is taken depending on whether the packet should be filtered out of the rest of the process. In one system of the invention DNS (domain name service) lookup request and responses are deemed not necessary to be processed and stored, and are filtered out. In step 1610 a determination is made as to whether or not the current packet is a packet in response to a request. If not, execution loops to step 1602 to get the next packet. Otherwise the packet is added to a packet sorted list in step 1612. This procedure is continued until all specified packets have been processed in this manner.

FIG. 21 illustrates the organization of a packet sorted list. Packets are organized by nodes, in this example nodes 2100, 2102, 2104, and 2106. In the course of operation of a browser or other client, multiple requests may be simultaneously sent in order to achieve responses earlier for fast performance. Responses from servers may be received in different orders, with the packets potentially interleaved. It is therefore necessary to sort the packets out by request. For TCP/IP, each request will be handled by a single local port, in the example of FIG. 21 ports 1259, 1176, 1245, and 1260 to servers at IP addresses 205.230.142.1, 142.204.27.1, 205.230.142.2, and again 205.230.142.1, respectively. For each request, a number of packets will be received. The received packets may usually arrive in sequential order, but that is not a safe assumption where packets may be routed over differing routes, as is known to happen on the Internet and other networks. In the organization, therefore, packets are sorted by responses to requests and further by the associated TCP sequential number included with the packet to assure a correct ordering. Other protocols may also be sorted in a packet sorted list using a similar technique.

Figure 17A:
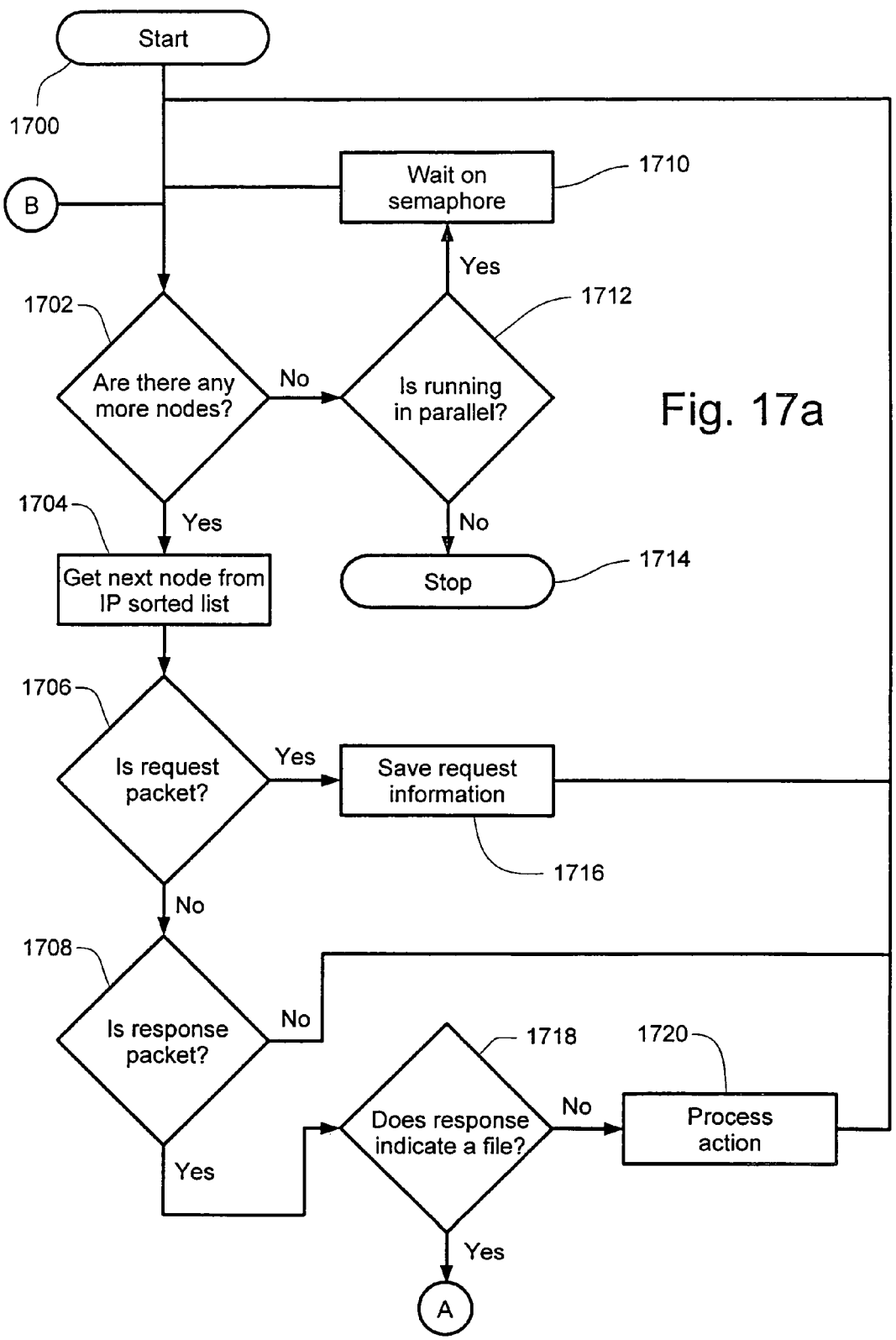
FIG. 17 depicts a process of file reconstruction from network traffic data.
Figure 17B:
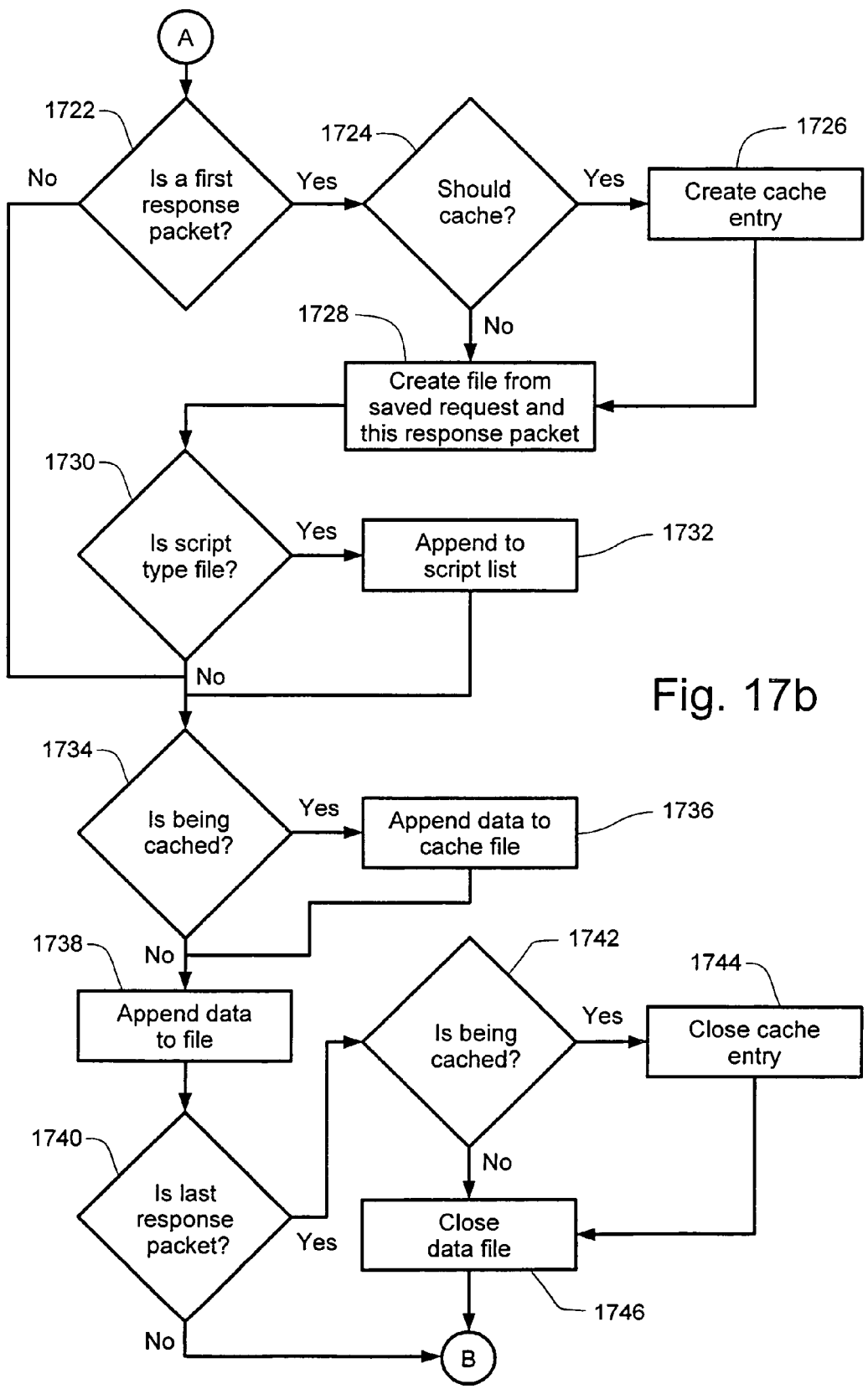

Referring now to FIG. 17, a method is illustrated by flowchart including a process of reconstruction of files, adding script files to a script master list, and adding files to a cache. A packet sorted list is scanned through by retrieving the first node in chronological order and then reading the first node with the specified IP address and port number. Referring back to the example of FIG. 21, nodes would be processed in the chronological order 2100, 2102, 2104, and 2106. Starting at the first node 2100, the packets would be processed in the order P3, P4, and P6. The other nodes are processed in similar fashion. In step 1702, a check is made to determine if there are any remaining packets to be processed. If not, execution proceeds to step 1712, and to ending step 1714 if the process is not a parallel process. Otherwise, execution proceeds to step 1710 in which the process is halted pending the modification of a semaphore, or notification by a signal from another process that more packets are available for processing. Execution then proceeds from step 1710 to step 1702 to again consider whether there are remaining packets to be processed. If the consideration of step 1702 indicates that a packet is remaining, it is retrieved in step 1704, execution then proceeding to step 1706. In step 1706 a determination is made as to whether or not the retrieved packet is a request packet. If the retrieved packet is a request packet, the request information is saved in step 1716 and execution of the loop repeats at step 1702. Request packets may contain information that is useful in interpreting response packets. Therefore request packets may be retained until all the response packets associated with a request are processed, or longer if desired. If the retrieved packet is not a request packet, a determination is made as to whether or not the packet is part of a response. If not, the packet is discarded and execution proceeds to step 1702. If the packet is part of a response, execution proceeds to step 1718, in which a determination is made as to whether or not the response includes information that should be saved to a file. Generally the first packet of a response will contain response codes or information about the response, and the determination of step 1718 can generally be made upon processing of a first response packet. For example, a request for an image file may return a response of several packets, the first packet containing an affirmation and the following packets the requested image file. If, in step 1718, a packet arrives that does not indicate a file, step 1720 is executed whereby an action may be taken to control the method behavior of successive packets within the response. This control may reflect the way a browser or other client application or system would handle the response. In one example, if the response is an HTTP redirect, the response may be ignored, because a redirect operation requests responses from a different server. A successive response will contain that redirected response, and will appear later in processing.

If the determination of step 1720 indicates the response includes a file needing to be saved, step 1722 is executed, in which a determination is made as to whether or not the received packet is the first packet of a response. If no, execution continues at step 1734. Otherwise, a determination is made as to whether or not the file or files associated with the response should be cached in step 1724. If a cache entry is appropriate it is created in step 1726. In either case, step 1728 is executed in which a file is created using the saved request and the first response packet. This file may be based on the location in the request packet or in the first response packet. A directory structure specified in the request or response packet may be recreated, if necessary, in storage. Data included in the first packet is included in the file, which is appended to as successive packets are processed. In illustration of one example of data file and directory creation, a request packet requests an image from a directory on a web server at /files/images/image.gif. A corresponding directory of X:/optional_directories/files/images would be created, where X: is the drive letter and optional_directories is a root directory for the storage of recreated files and directories. The file image.gif would be placed in that directory.

Execution continues from step 1728 to step 1730, in which a determination is made as to whether or not a file of the first response packet is a script file. If yes, the name, and location if necessary, of the file is recorded to a script list. The recording of the name of the file may be an append operation to retain the script list in chronological order. Execution continues from either of steps 1730 or 1732 to step 1734, in which a determination is made as to whether or not the file or files of the response are being cached. If yes, execution is bypassed to step 1736 in which file data contained in the response packet is appended to a cache file created in step 1726. Execution proceeds from steps 1734 or 1736 to step 1738, in which files of the responses are appended to files created in step 1728. Step 1740 is then executed, in which a determination is made as to whether or not the current packet being processed is the last packet of a response. If yes, execution proceeds to steps 1742, 1744, and 1746 which close the cache entries and data files created in steps 1726 and 1728. Execution then repeats at step 1702, getting the next available packet.

One difficulty in recreating a web session is that some of the files and information needed to recreate the session are not transmitted over a network. Files that have been cached by a web browser, from a previous session, are examples of information that are unavailable from a session of captures packets. In some systems of the invention, a cache server is used in combination with a web session reconstructor to assist with this problem. A cache server is a separate computer or process that stores files from previous web sessions. The cache server recreates files by capturing network traffic. These files are stored for long periods of time, and are made available to clients. Using a cache server files with script attributes can be scanned for missing files and information. If a file is not present, a request to a cache server can be made to determine if the file is available and retrieve that file. This permits a more complete presentation of a web page or session.

FIG. 22 illustrates a cache server system of the invention. First a formatted data parser 2200 reads and parses formatted data read from captured packets and reformatted to enable the reconstruction of a web page. That parsed data is passed to a script file scanner 2202, which scans the formatted data for files with script attributes, and also scans for missing files referenced by the script attributed files. If a file is missing, for example an image that is needed to complete a web page display, a request is made to the cache server 2204. A response is sent back to script file scanner 2202 containing the requested file, if available. On a successful response of the cache server 2204 the script file scanner 2202 sends location information along with the received file to the file location coordinator 2206. The file location coordinator 2206 then places the file in local storage 2208 in the correct location or in a web browser cache. Afterward a system referencing the local storage 2208 may display the completed data.

Figure 18:
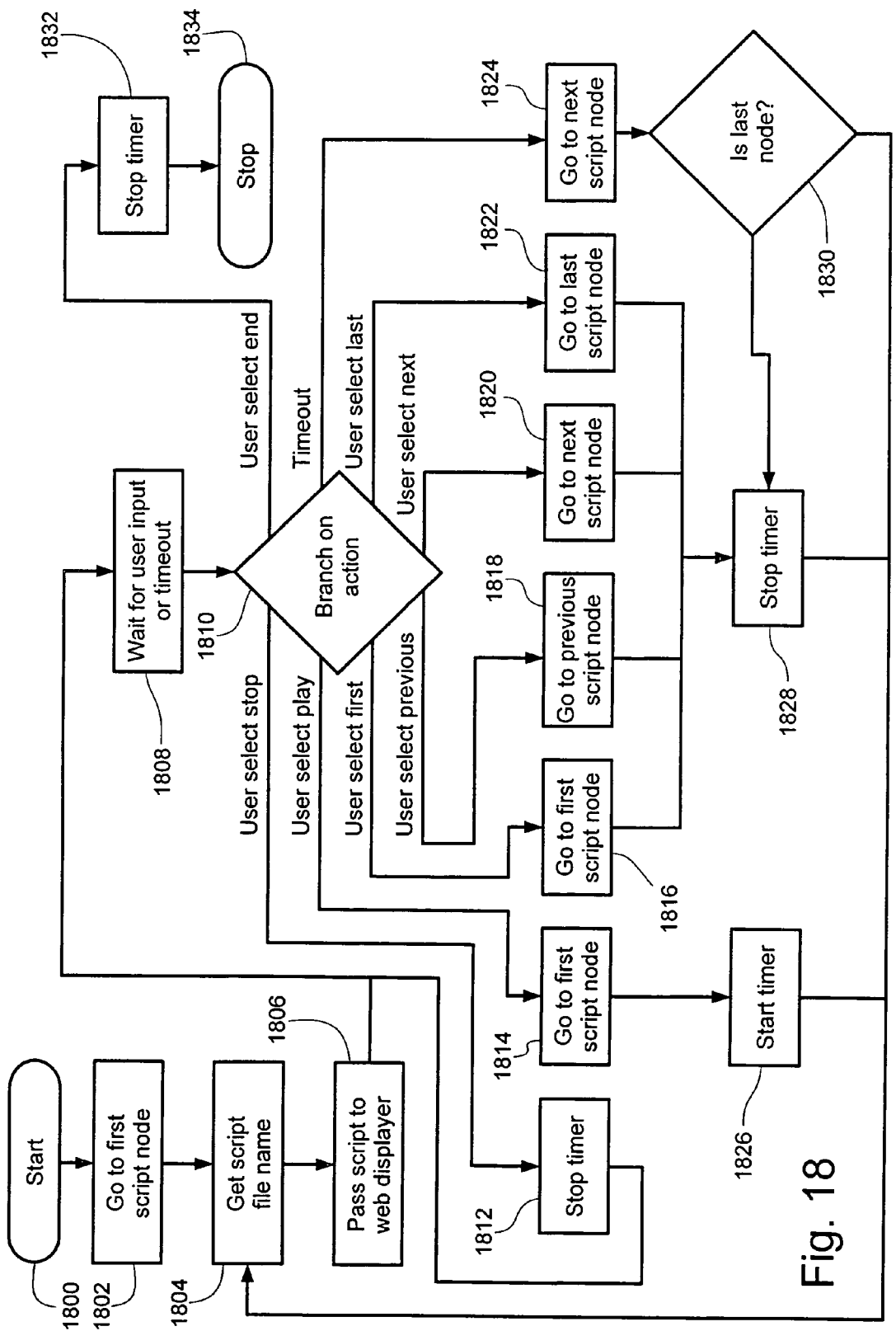
FIG. 18 illustrates one process of presenting reconstructed web sessions.

FIG. 18 illustrates one method of presenting reconstructed web sessions to a user. The process begins by reading the first script node from the script master list, as in step 1802. This is the first script node from the script master list. The script nodes contain locations of a script files, for example C:/files/html_files/webpage1.html or www.website.com/page.html. That location is retrieved in step 1804 and passed to a display program, such as a web browser, in step 1806. Execution proceeds to step 1808 wherein the process halts pending user input or timeout. Upon receipt of a user response or timeout, execution proceeds to step 1810, which causes the process to branch depending on the event. If a timeout occurs before any user response is received, the process gets the next node in step 1824, and checks to see if that node is the last node in step 1830. If a last node is detected, the timer is stopped in step 1828 so as to stop automatic playback of the node sequence. Execution proceeds from steps 1830 or 1828 to step 1804, in which a next script node location is passed to the displayer. Returning to step 1810, if a user has selected "stop", step 1812 is executed stopping the timer. Execution then returns to step 1808 to await further user input. If in step 1810 a user has selected "play", steps 1814 and 1826 are executed which returns the process to the first script node, restarts the timer, and returns to step 1808 to await further user input or timeout. If in step 1810 a user has selected "first", "previous", "next", or "last" one of steps 1816, 1818, 1820 or 1822 is executed which sets the currently displayed node as appropriate to the input, executes step 1828 stopping the timer, and returns to step 1808 to await further user input. If in step 1810 a user has selected "end", the timer is stopped in step 1832 to avoid spurious timer alarms and the process is halted.

Figure 19:
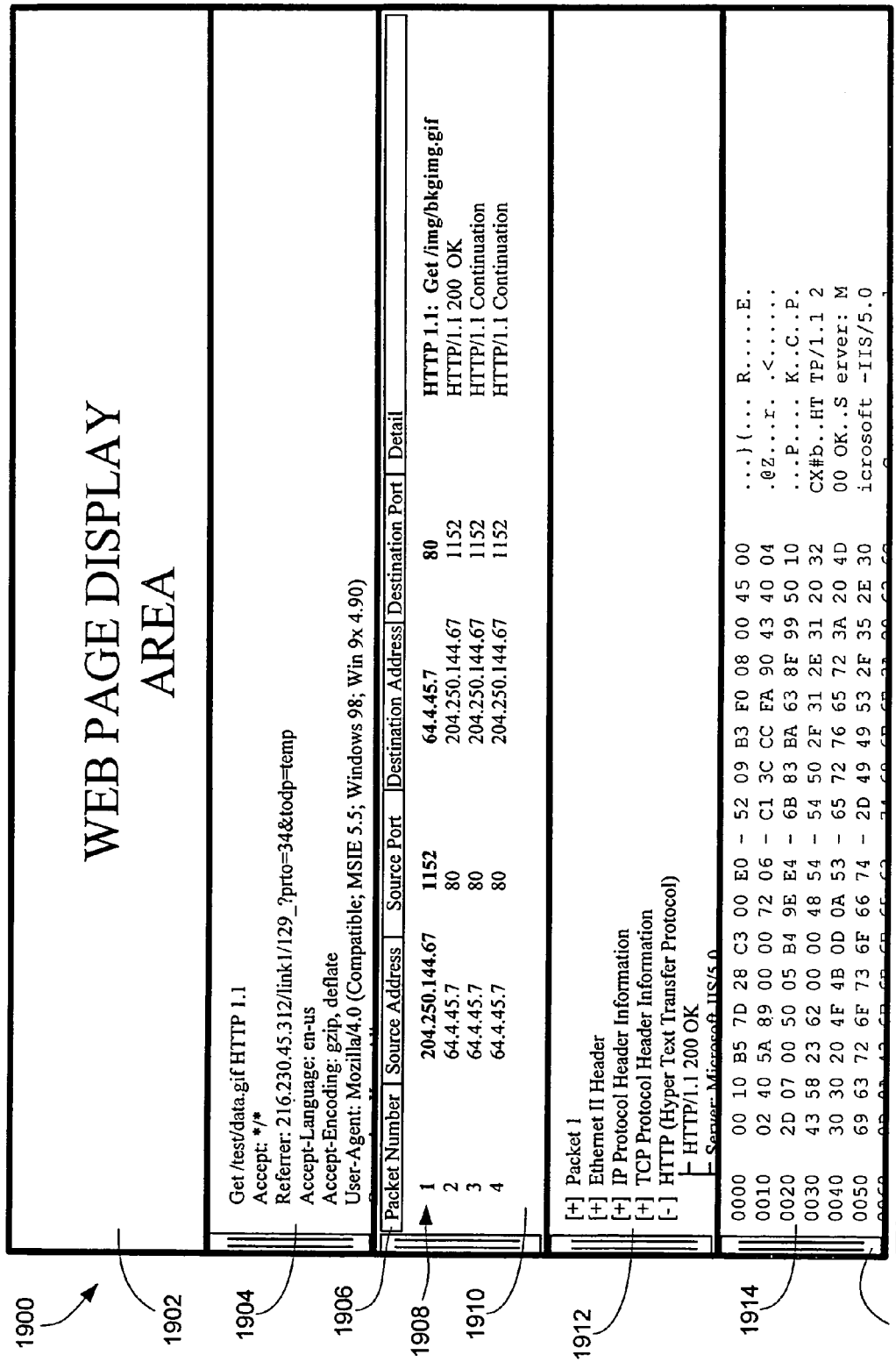
FIG. 19 depicts an example web session display.

Depicted in FIG. 19 is an example display 1900 whereby web sessions may be presented to a user. A web page display 1902 may be provided to display graphical portions of a web page, for example an HTML interpretation or a graphic file. This window may be scrollable to allow review of a display too large to fit within the display window 1902. A session display 1904 may be provided to show printable or displayable data of a currently selected TCP/IP session, which is shown in the example of FIG. 19 to be an HTTP session. An alternate session display may be provided to show, at a high level, the requests and responses of the requests forming the node. An alternate session display may contain text that may be selected; in which case selection of the text may cause display 1900 to display the session content at the stream location of the selection. A packet display window 1910 may be provided to show packets of a node or session. In the example of FIG. 1900, the first packet 1908 has been selected by a user, a packet decode display 1912 and a packet dump display 1914 to reflect the data of the selected packet. Selection of a packet may also cause the session and the web page display 1902 to be updated. Column headers 1906 may be configured by the user to add, delete or rearrange the displayed packet information. A packet decode display 1912 may be provided to present a decode of the currently selected packet. The user can select + or expand or – to collapse a decode in the hierarchical tree. The user can also select information in any of the expanded limbs of the decode tree, which causes that information to be selected in the packet dump display 1914. A packet dump display 1914 may be provided to give a low-level representation of a packet, for example the hexadecimal values and ASCII text of the packet. In the example of FIG. 1900, dockable bars 1914 are provided to allow a user to move, remove, or dock the several windows. A user may also be provided with an independent window by double-clicking on the dockable bar.

FIG. 20 illustrates a web page display 2000 in a stand-alone window. A display area 2012 is provided to display graphical elements of a node of a web session, for example an HTML page or a graphics file. A play button 2002 starts a replay of the web session in a slide show format. A back button 2004 and a next button 2006 may be clicked to move to a previous or next node or page in the session. A stop button 2008 may be clicked to stop the playback of the web session. An exit button 2010 may be clicked to close the window. A URL edit box 2014 and go button 2016 are provided to allow a user to specify one of the reconstructed web pages for display.

Figure 23:
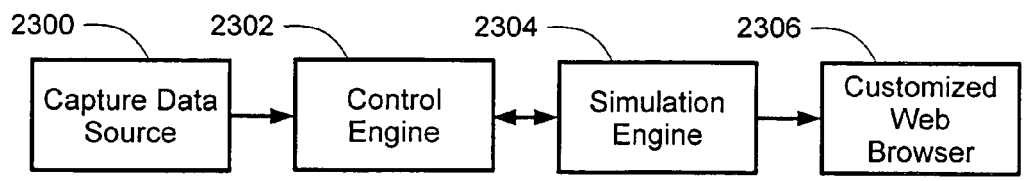
FIG. 23 illustrates one simulation engine system.

In other systems of the invention, a simulation engine is used to reconstruct web sessions and communicate these to a client, such as a web browser. Referring to FIG. 23, a capture data source 2300 provides capture data to a control engine 2302. Control engine 2302 reviews the incoming data to determine or filter portions that are compliant request or reply packets. The control engine 2302 parses the packets for HTTP requests and responses and organizes the incoming packets into a sorted list, as described above. Note that although HTTP request and response packets are spoken of and illustrated here, other request and response packet types or Internet protocols may be used, such as the HTTPS and FTP protocols. As the packets are being sorted into a packet sorted list, the packets can also be sent in parallel to a simulation engine 2304, either after a pre-specified number have been added to the packet sorted list, or once the end of the capture data stream is reached.

The simulation engine 2304 determines whether a packet is a request or a response. If it is a request packet the packet is saved and sent to a customized web browser 2306 that treats the packet as if the web browser 2306 itself had made the request. The simulation engine then sends a message back to the control engine 2302 asking it to send response packets. As an alternative, the control engine may send the response packets without waiting for a request from the simulation engine. In either case, control engine 2302 sends all response packets associated with the request packet sent earlier. The control engine 2302 uses the packet sorted list to locate the response packets to send. Simulation engine 2304 receives the response packets, and redirects them to the customized web browser 2306. Customized web browser 2306 processes the response packets as if the responses came from the original source.

After displaying a web page, a delay is asserted to wait for either user input or a timeout, or a new request sent to control engine 2302. The user may be given options to proceed to a next page, to return to a previous page, to begin or end a timer, to playback a web page sequence automatically with fixed time, to playback a web session based on capture time, to show in real time, and other options as desired. If it is desired to show a web session based on capture time, control engine 2302 may use the packet timestamps to determine when to send the next request and response session to simulation engine 2304. If operation is desired to display web sessions in real time, packets are passed to simulation engine 2304 as soon as they are processed by capture engine 2302.

Figure 24:
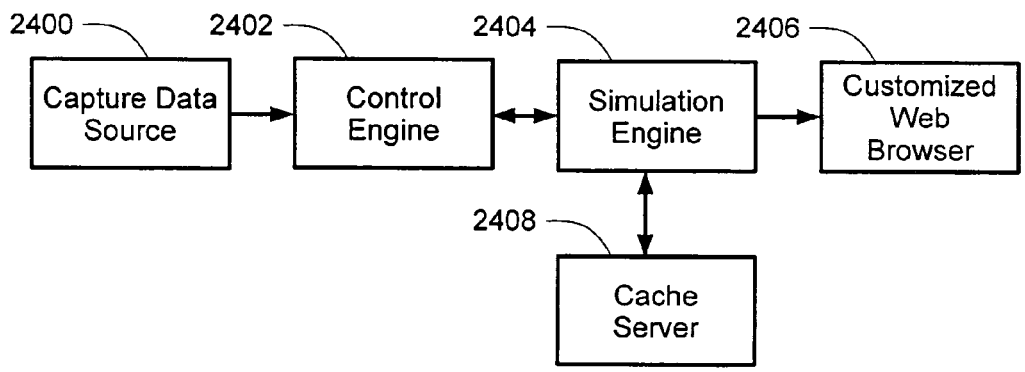
FIG. 24 illustrates another simulation engine system combining a cache server.

Referring to FIG. 24, a simulation engine system is depicted having a cache server. The use of a cache server 2408 is not a mandatory element of the system, but may be used to create a more robust and complete presentation. Web pages that contain unavailable references can be redirected to a cache server similarly to the way a web browser redirects requests to a local cache. If a file is found to be unavailable, a request to a cache server can be made to determine if the cache server has a copy of the unavailable file. If simulation engine 2404 determines that a file is missing, a request is made to cache server 2408. A response is returned to the simulation engine 2404 containing the requested file. The file may then be displayed.

Figure 25:
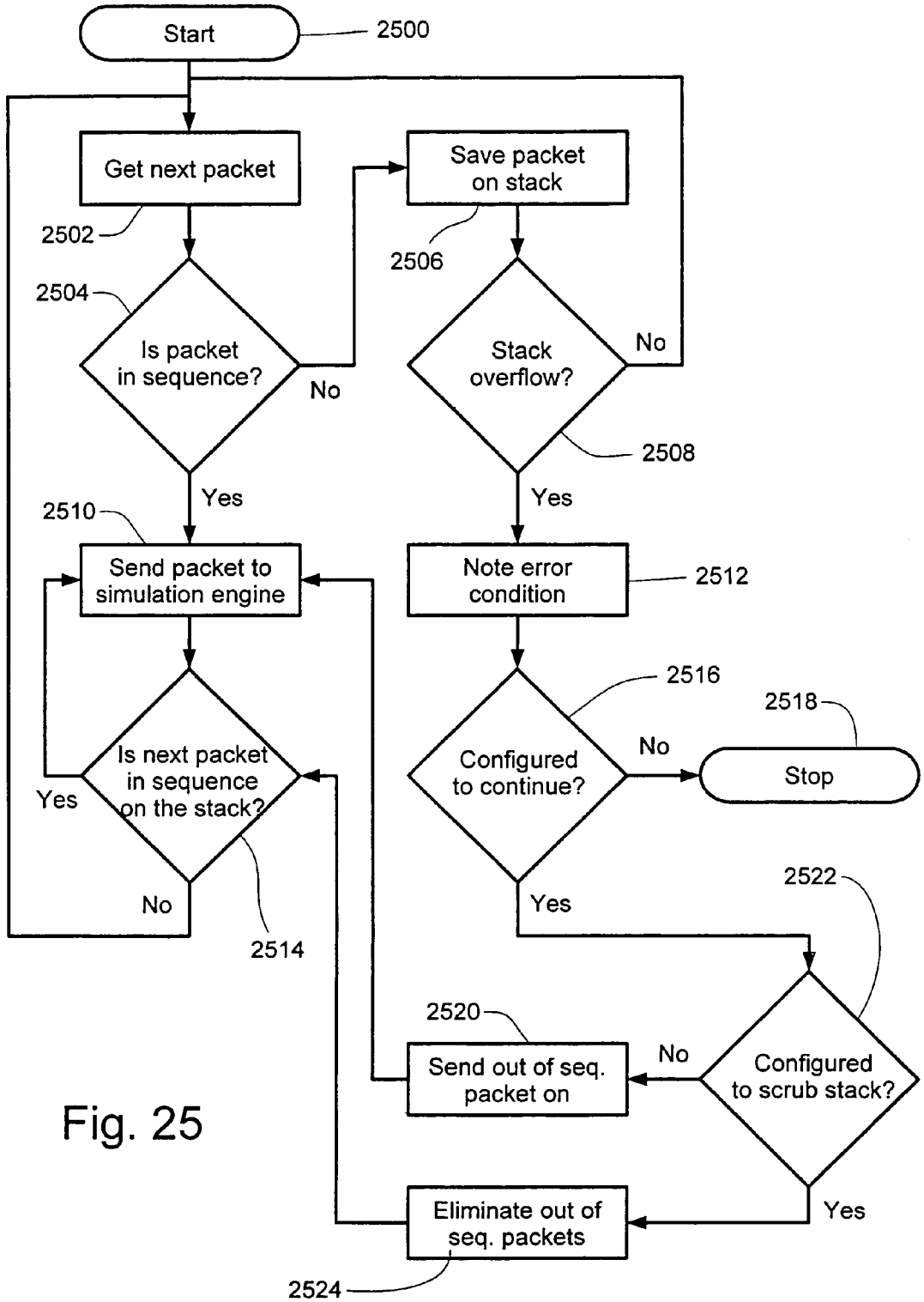
FIG. 25 depicts a process of sequencing incoming packets for a simulation engine.

Packet sorted lists may be composed of IP packets, TCP packets, or other types of packets having sequence information as will be understood by those skilled in the art. FIG. 25 depicts a procedure by flowchart whereby TCP packets may be provided to a simulation engine. At step 2502 the next packet is retrieved. If no further packets are available for retrieval execution may stop, or wait for new packets to become available. Execution proceeds to step 2504 in which a decision is made determining if the newly retrieved packet is the next in a sequence. If not, execution proceeds to step 2506 in which the newly retrieved packet is saved to a stack. Afterward, in step 2508 a test for stack overflow is performed, and if there is no problem the loop repeats at step 2502. If in step 2504 a packet is discovered to be the next of a sequence, it is provided in step 2510 to a simulation engine, or other receiver. A test is then performed, in step 2514, to determine whether or not the next packet of the sequence is on the stack. If yes, that successive packet is sent to the simulation engine in step 2510, the loop of steps 2510 and 2514 repeating until the next packet of a sequence is not on the stack. When, in step 2514, the next packet of a sequence is not found on the stack, execution proceeds back to step 2502 to get the next packet. If in step 2508 a stack overflow condition is detected, the optional step of 2512 is executed in which the error condition is noted. Execution proceeds to step 2516, which tests a configuration element to see if it is desired to attempt a recovery by continuing. If configured to halt, execution stops at 2518. Otherwise execution proceeds to step 2522, in which a determination is made as to whether or not a configuration element shows it is desired to scrub the stack. If no, a packet is selected from the stack which is not in sequence to clear a packet location in step 2520, and execution continues in 2510 in which the selected packet is sent to the simulation engine. If yes, an algorithm is run which removes packets which are out of sequence from the stack. In that case, execution may continue at step 2514.

While the present invention has been described and illustrated in conjunction with a number of specific embodiments, those skilled in the art will appreciate that variations and modifications may be made without departing from the principles of the inventions as herein illustrated, described and claimed. The methods and structures described in the drawings are illustrative in nature only.

The present invention may be embodied in other specific forms without departing from their spirit or characteristics. The described embodiments are to be considered in all respects as only illustrative, and not restrictive. The scope of the invention is, therefore, indicated by the appended claims, rather than the foregoing description. All changes that come within the meaning and range of equivalency of the claims are to be embraced within their scope.

The invention claimed is:

1. A method, comprising:

accepting network data;

displaying a graphical timeline on a display;

displaying a position on the graphical timeline representative of the network data for network analysis;

displaying on the display data start and end features in association with the graphical timeline;

displaying on the display selection start and end features in association with the graphical timeline, the selection start and end features being displayed at positions relative to the data start and end features with regard to the corresponding times;

accepting a selection of a new selection start position from a user;

accepting a selection of a new selection end position from the user; and providing an indication of an amount of selected network data to the user, the indication reflecting a change in the selection of the new selection start position or the selection of the new selection end position;

wherein the amount of selected network data is approximated if a calculation of the amount of selected network data requires more resources than are available.

2. The method of claim 1, wherein the position is selected utilizing a clock.

3. The method of claim 2, wherein the position is selected utilizing a digital clock.

4. The method of claim 2, wherein the position is selected utilizing an analog clock.

5. The method of claim 2, wherein the position is selected utilizing a calendar.

6. The method of claim 2, wherein the position spans a start position and a stop position.

7. The method of claim 1, further comprising:

accepting a selection of a time of day in a displayed clock from the user;

modifying a selection start time or a selection end time associated with the network analysis of the network data according to the selection; and displaying the selection start and end features at a new relative position.

8. The method of claim 1, further comprising:

accepting a selection of a day in a displayed calendar from the user;

modifying a selection start time or a selection end time associated with the network analysis of the network data according to the selection day input; and displaying the selection start and end features at a new relative position.

9. The method of claim 1, further comprising displaying on the display the indication of the amount of selected data.

10. The method of claim 1, wherein the selection start and end features allow the user to select the new selection start position and the new selection end position.

11. The method of claim 1, wherein the selection start and end features include arrowheads that are dragged by the user to select the new selection start position and the new selection end position.

12. The method of claim 1, wherein the selection of the new selection start position and the new selection end position is made using a text box.

13. The method of claim 1, wherein the selection of the new selection start position and the new selection end position is made using a calendar that permits selection of a calendar date.

14. A computer program product embodied on a computer readable medium, comprising:
   computer code for identifying network data;
   computer code for displaying a graphical timeline on a display;
   computer code for displaying a position on the graphical timeline representative of the network data for network analysis;
   computer code for displaying on the display data start and end features in association with the graphical timeline;
   computer code for displaying on the display selection start and end features in association with the graphical timeline, the selection start and end features being displayed at positions relative to the data start and end features with regard to the corresponding times;
   computer code for accepting a selection of a new selection start position from a user;
   computer code for accepting a selection of a new selection end position from the user; and
   computer code for providing an indication of an amount of selected network data to the user, the indication reflecting a change in the selection of the new selection start position or the selection of the new selection end position;
   wherein the computer pro ram product is operable such that the amount of selected network data is approximated if a calculation of the amount of selected network data requires more resources than are available.

15. The computer program product of claim 14, wherein the position is selected utilizing a clock.

16. The computer program product of claim 15, wherein the position is selected utilizing a digital clock.

17. The computer program product of claim 15, wherein the position is selected utilizing an analog clock.

18. The computer program product of claim 15, wherein the position is selected utilizing a calendar.

19. The computer program product of claim 15, wherein the position spans a start position and a stop position.

20. A method, comprising:
   accessing network data;
   displaying at least one of a clock and a calendar;
   analyzing the network data using the at least one of a clock and a calendar;
   displaying a graphical timeline on a display;
   displaying on the display data start and end features in association with the graphical timeline;
   displaying on the display selection start and end features in association with the graphical timeline, the selection start and end features being displayed at positions relative to the data start and end features with regard to the corresponding times;
   accepting a selection of a new selection start position from a user;
   accepting a selection of a new selection end position from the user; and
   providing an indication of an amount of selected network data to the user, the indication reflecting a change in the selection of the new selection start position or the selection of the new selection end position;
   wherein the amount of selected network data is approximated if a calculation of the amount of selected network data requires more resources than are available.

21. A computer program product embodied on a tangible computer readable medium, comprising:
   computer code for identifying network data;
   computer code for displaying at least one of a clock and a calendar;
   computer code for analyzing the network data using the at least one of a clock and a calendar;
   computer code for displaying a graphical timeline on a display;
   computer code for displaying on the display data start and end features in association with the graphical timeline;
   computer code for displaying on the display selection start and end features in association with the graphical timeline, the selection start and end features being displayed at positions relative to the data start and end features with regard to the corresponding times;
   computer code for accepting a selection of a new selection start position from a user;
   computer code for accepting a selection of a new selection end position from the user; and
   computer code for providing an indication of an amount of selected network data to the user, the indication reflecting a change in the selection of the new selection start position or the selection of the new selection end position;
   wherein the computer program product is operable such that the amount of selected network data is approximated if a calculation of the amount of selected network data requires more resources than are available.

* * * * *